US010017189B2

(12) United States Patent
Yamada et al.

(10) Patent No.: US 10,017,189 B2
(45) Date of Patent: Jul. 10, 2018

(54) DRIVING SUPPORT DEVICE, DRIVING SUPPORT SYSTEM, AND DRIVING SUPPORT METHOD

(71) Applicant: Panasonic Intellectual Property Management Co., Ltd., Osaka (JP)

(72) Inventors: Kazushige Yamada, Kanagawa (JP); Osamu Yamaji, Hiroshima (JP); Azusa Gojyo, Kanagawa (JP); Satoshi Kajita, Kanagawa (JP); Toshiaki Mori, Kanagawa (JP); Makoto Okada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/503,385

(22) PCT Filed: Jul. 19, 2016

(86) PCT No.: PCT/JP2016/003380
§ 371 (c)(1),
(2) Date: Feb. 10, 2017

(87) PCT Pub. No.: WO2017/022196
PCT Pub. Date: Feb. 9, 2017

(65) Prior Publication Data
US 2017/0225691 A1  Aug. 10, 2017

(30) Foreign Application Priority Data
Jul. 31, 2015 (JP) .................................. 2015-152848

(51) Int. Cl.
*B60W 50/10* (2012.01)
*B60K 35/00* (2006.01)
(Continued)

(52) U.S. Cl.
CPC ............. *B60W 50/10* (2013.01); *B60K 35/00* (2013.01); *B60W 10/04* (2013.01); *B60W 10/18* (2013.01);
(Continued)

(58) Field of Classification Search
CPC ...... B60W 50/10; B60W 50/14; B60W 10/04; B60W 10/18; B60W 10/20;
(Continued)

(56) References Cited

U.S. PATENT DOCUMENTS 6,356,820 B1   3/2002   Hashimoto et al.
9,665,102 B2 *  5/2017   Switkes ............... G05D 1/0293
(Continued)

FOREIGN PATENT DOCUMENTS

JP   2000-331296   11/2000
JP   2003-115095   4/2003
(Continued)

OTHER PUBLICATIONS

International Search Report of PCT application No. PCT/JP2016/003380 dated Sep. 20, 2016.

*Primary Examiner* — Anne M Antonucci
*Assistant Examiner* — James E Stroud
(74) *Attorney, Agent, or Firm* — Seed IP Law Group LLP

(57) ABSTRACT

In a driving support device, an image output unit outputs an image including a host vehicle object representing a host vehicle and a nearby vehicle object representing a nearby vehicle, to a display unit. The operation signal input unit receives an operation of a user for changing a distance between the host vehicle object and the nearby vehicle object in the image displayed on the display unit. The command output unit outputs a command for instructing one vehicle to travel following another vehicle when the distance between the host vehicle object and the nearby vehicle (Continued)

object is equal to or less than a predetermined distance, to an automatic driving control unit that controls automatic driving.

14 Claims, 37 Drawing Sheets

(51) Int. Cl.
| | |
|---|---|
| G08G 1/0967 | (2006.01) |
| B60W 30/165 | (2012.01) |
| B60W 50/14 | (2012.01) |
| B60W 10/20 | (2006.01) |
| B60W 10/18 | (2012.01) |
| B60W 10/04 | (2006.01) |
| B60W 30/18 | (2012.01) |
| G05D 1/00 | (2006.01) |
| G06F 3/0488 | (2013.01) |
| G06F 3/0481 | (2013.01) |
| G06F 3/0484 | (2013.01) |
| G06F 3/0486 | (2013.01) |

(52) U.S. Cl.
CPC .......... *B60W 10/20* (2013.01); *B60W 30/165* (2013.01); *B60W 30/18163* (2013.01); *B60W 50/14* (2013.01); *G05D 1/0088* (2013.01); *G06F 3/0486* (2013.01); *G06F 3/04817* (2013.01); *G06F 3/04845* (2013.01); *G06F 3/04883* (2013.01); *G08G 1/096791* (2013.01); *B60K 2350/1028* (2013.01); *B60K 2350/1052* (2013.01); *B60W 2050/146* (2013.01); *B60W 2510/0638* (2013.01); *B60W 2510/081* (2013.01); *B60W 2510/18* (2013.01); *B60W 2510/20* (2013.01); *B60W 2520/105* (2013.01); *B60W 2550/308* (2013.01); *B60W 2710/0644* (2013.01); *B60W 2710/081* (2013.01); *B60W 2710/18* (2013.01); *B60W 2710/20* (2013.01); *B60W 2720/106* (2013.01); *B60W 2750/308* (2013.01)

(58) Field of Classification Search
CPC ... B60W 2050/146; B60W 2510/0638; B60W 2510/081; B60W 2510/18; B60W 2510/20; B60W 2520/105; B60W 2550/308; B60W 2710/0644; B60W 2710/081; B60W 2710/18; B60W 2710/20; B60W 2720/106; B60W 2750/308; B60K 35/00; B60K 35/165; B60K 2350/1028; B60K 2350/1052; B30W 30/165; B30W 30/18163; G05D 1/0088; G06F 3/04817; G06F 3/04845; G06F 3/0486; G06F 3/04883; G08G 1/096791
USPC .......................................................... 701/23
See application file for complete search history.

(56) References Cited

U.S. PATENT DOCUMENTS

| | | | |
|---|---|---|---|
| 2006/0265115 | A1 | 11/2006 | Etori et al. |
| 2010/0256852 | A1* | 10/2010 | Mudalige ............... G08G 1/163 701/24 |
| 2011/0251768 | A1* | 10/2011 | Luo ....................... B60W 30/12 701/70 |
| 2012/0022716 | A1 | 1/2012 | Kitahama et al. |
| 2015/0032290 | A1 | 1/2015 | Kitahama et al. |

FOREIGN PATENT DOCUMENTS

| | | |
|---|---|---|
| JP | 2005-041433 | 2/2005 |
| JP | 2006-321426 | 11/2006 |
| JP | 2010-198578 | 9/2010 |
| JP | 2012-076483 | 4/2012 |
| JP | 2013-067303 | 4/2013 |
| JP | 2013-083520 | 5/2013 |

* cited by examiner (a)　　　　　(b)　　　　　(c)

(a)          (b)          (c)

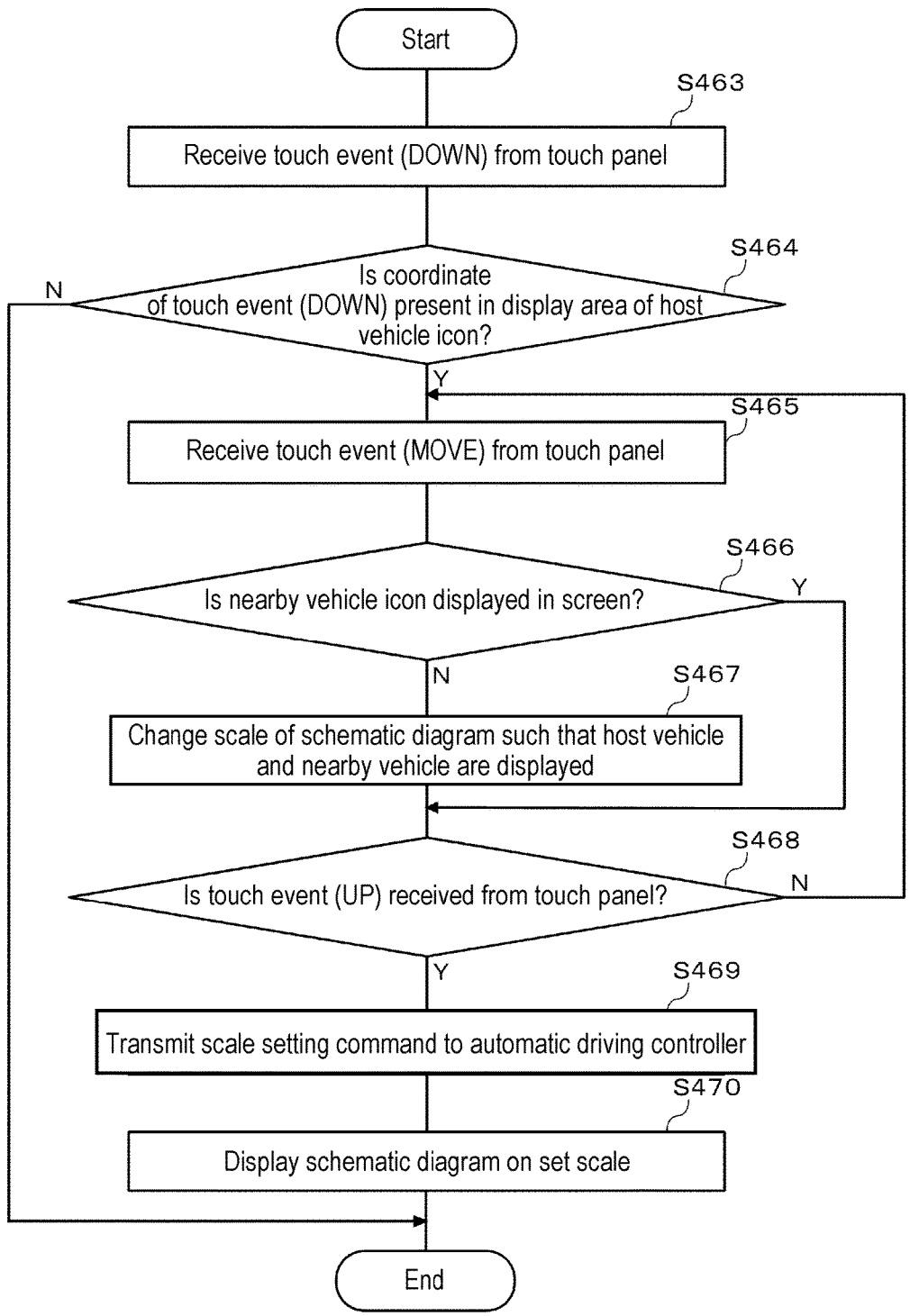

(a)  (b)

(a)  (b)

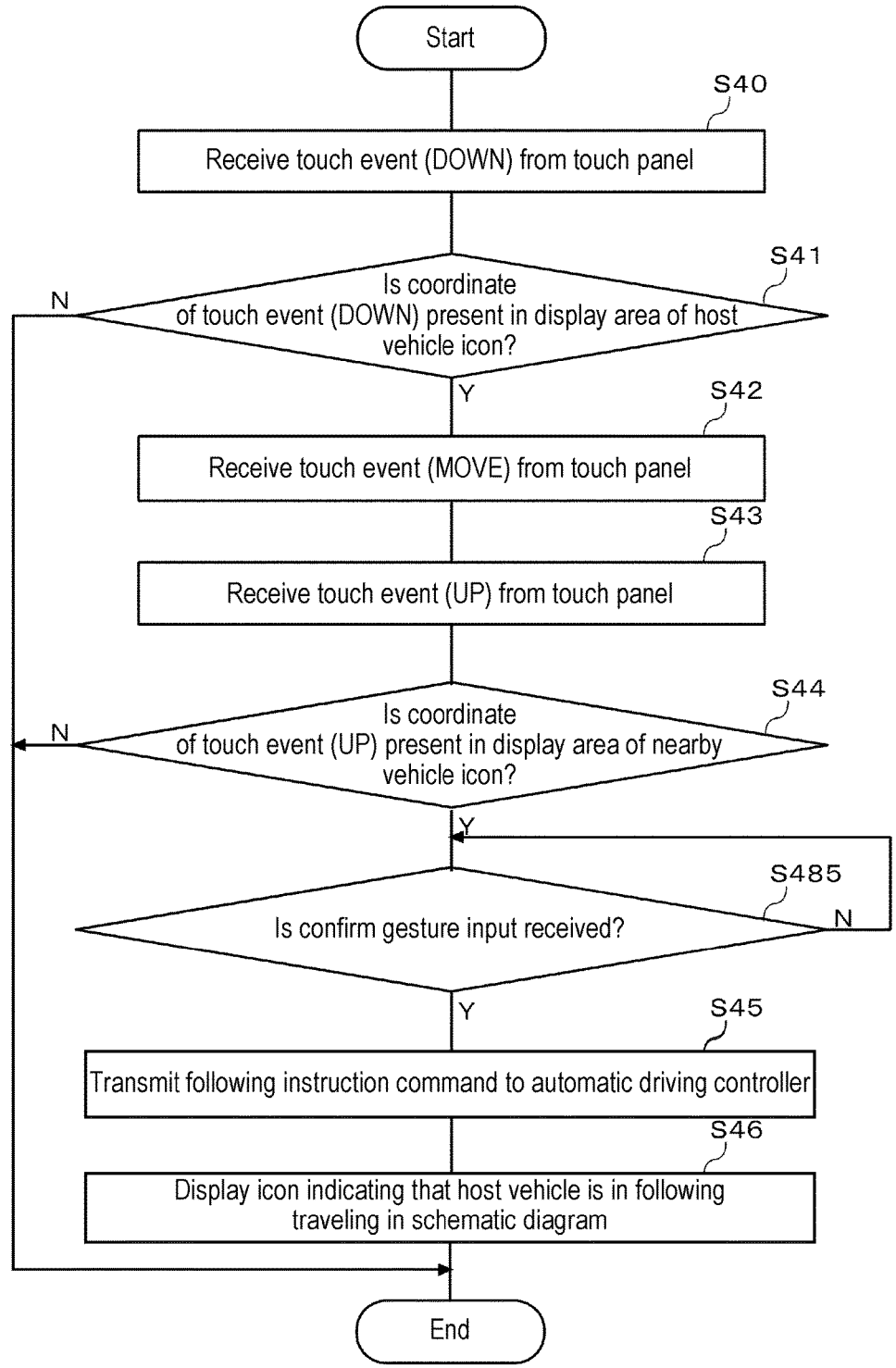

FIG. 38A  FIG. 38B  FIG. 38C
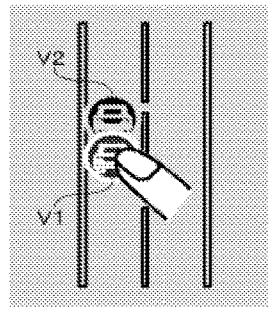 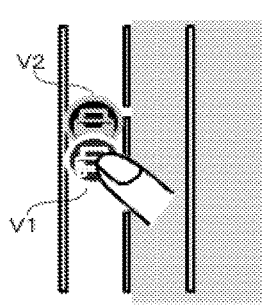 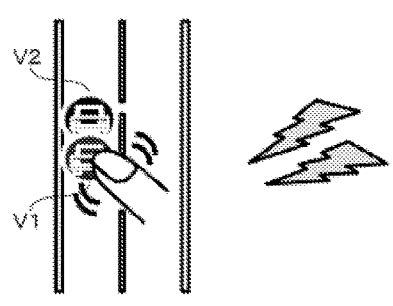
FIG. 39
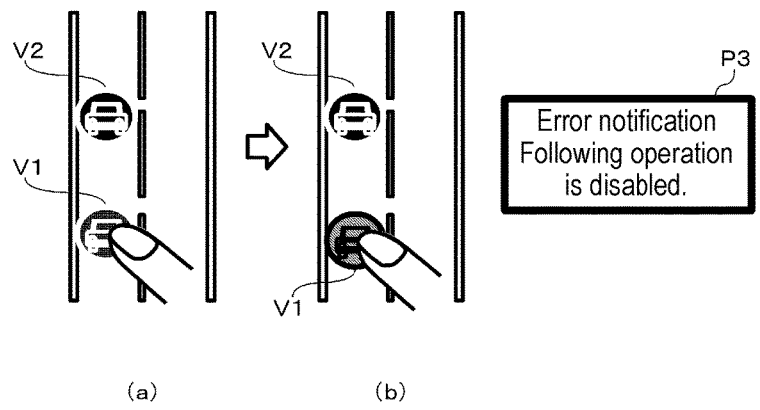
(a)  (b)

DRIVING SUPPORT DEVICE, DRIVING SUPPORT SYSTEM, AND DRIVING SUPPORT METHOD

CROSS-REFERENCE TO RELATED APPLICATIONS

This application is a U.S. national stage application of the PCT International Application No. PCT/JP2016/003380 filed on Jul. 19, 2016, which claims the benefit of foreign priority of Japanese patent application No. 2015-152848 filed on Jul. 31, 2015, the contents all of which are incorporated herein by reference.

TECHNICAL FIELD

The present invention relates to a technique that supports a driving operation instruction of a driver to a vehicle during automatic driving.

BACKGROUND ART

In recent years, developments in automatic driving have progressed. For automatic driving, autonomy levels defined in 2013 by the National Highway Traffic Safety Administration (NHTSA) are classified as no autonomy (level 0), specific-function autonomy (level 1), complex-function autonomy (level 2), semi-automatic driving (level 3), and full-automatic driving (level 4). Level 1 is a driving support system that automatically performs one of acceleration, deceleration, and steering, and level 2 is a driving support system that automatically performs two or more of acceleration, deceleration, and steering in coordination. In all cases, a driver is required to be involved in a driving operation. Autonomy level 4 is a fully-automatic driving system that automatically performs all of acceleration, deceleration, and steering, and thus a driver is not involved in a driving operation. Autonomy level 3 is a semi-fully-automatic driving system that automatically performs all of acceleration, deceleration, and steering, but if necessary, a driving operation is performed by a driver.

As a form of automatic driving, a form in which a driver does not operate an existing driving operation unit such as a steering, an accelerator pedal, or the like but instructs a specific driving operation such as traffic lane change, passing, following traveling, or the like to a vehicle by issuing a command to a vehicle is considered. In this form, a user interface in which there are fewer erroneous operations is required.

CITATION LIST

Patent Literature

PTL 1: Japanese Patent Unexamined Publication No. 2013-67303
PTL 2: Japanese Patent Unexamined Publication No. 2012-76483

SUMMARY OF THE INVENTION

An object of the present invention is to provide a technique that allows a driver to intuitively and conveniently instruct a specific driving operation to a vehicle.

A driving support device according to an aspect of the present invention includes an image output unit, an operation signal input unit, and a command output unit. The image output unit outputs an image including a host vehicle object representing a host vehicle and a nearby vehicle object representing nearby vehicle, to a display unit. The operation signal input unit receives an operation of a user for changing a distance between the host vehicle object and the nearby vehicle object in the image displayed on the display unit. The command output unit outputs a command for instructing one vehicle to travel following another vehicle when the distance between the host vehicle object and the nearby vehicle object is equal to or less than a predetermined distance, to an automatic driving control unit that controls automatic driving.

As another aspect of the present invention, an aspect in which an expression of the present invention is converted into a device, a system, a method, a program, a recording medium in which a program is recorded, and a vehicle equipped with the device by arbitrarily combining the above components is also effective.

According to the present invention, a driver can intuitively and conveniently instruct a specific driving operation to a vehicle.

BRIEF DESCRIPTION OF DRAWINGS

FIG. 29 is a flowchart illustrating a fourth processing example of issuing a following instruction command by a gesture operation according to the embodiment of the present invention.

FIG. 33 is a flowchart illustrating a fifth processing example of issuing a following instruction command by a gesture operation according to the embodiment of the present invention.

FIG. 37 is a diagram illustrating a display example of a host vehicle icon being dragged according to the embodiment of the present invention in a case where there is a drop disable area or the like.

FIG. 38A is a diagram illustrating another display example of a host vehicle icon being dragged according to the embodiment of the present invention in a case where there is a drop disable area or the like.

FIG. 38B is a diagram illustrating another display example of a host vehicle icon being dragged according to the embodiment of the present invention in a case where there is a drop disable area or the like.

FIG. 38C is a diagram illustrating another display example of a host vehicle icon being dragged according to the embodiment of the present invention in a case where there is a drop disable area or the like.

FIG. 39 is a diagram illustrating a display example according to the embodiment of the present invention in a case where a drag operation is disabled.

DESCRIPTION OF EMBODIMENTS

Prior to the description of an exemplary embodiment of the present invention, problems in an apparatus of the related art are briefly described. In a design in which each switch is designed for a specific driving operation such as traffic lane change, passing, following traveling, or the like, since the correspondence between a switch operation and automatic traveling control is not intuitive, selecting an instruction among many switches, or selecting a changed function with reduced switches according to a situation is a complex task. Thus, there is a problem in that a wide range of users including a person who has not been driving up to now, a person who wants to continue to drive even though the driving capability of the person has been reduced, or the like, cannot use an automatic driving vehicle without training.

Figure 1:
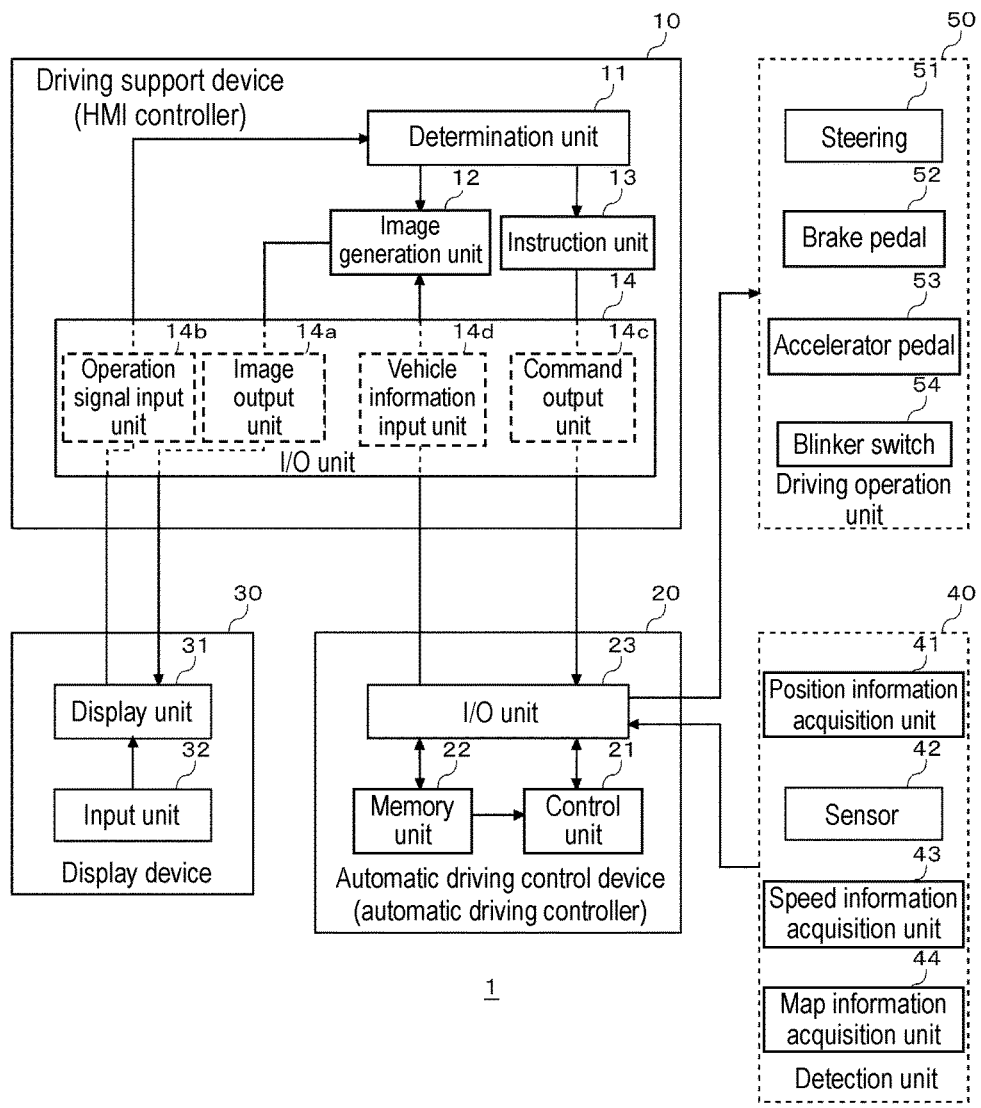
FIG. 1 is a block diagram illustrating a configuration of a vehicle according to an embodiment of the present invention.

Hereinafter, embodiments of the present invention will be described with reference to the drawings. FIG. 1 is a block diagram illustrating a configuration of vehicle 1 according to an embodiment of the present invention, and illustrates a configuration related to automatic driving. Vehicle 1 (a host vehicle) with an automatic driving mode includes driving support device (human-machine interface (HMI) controller) 10, automatic driving control device (automatic driving controller) 20, display device 30, detection unit 40, and driving operation unit 50.

Display device 30 includes display unit 31 and input unit 32. Display device 30 may be a head unit such as a car navigation system, a display audio, or the like, a portable terminal device such as a smart phone, a tablet, or the like, or a dedicated console terminal device.

Display unit 31 is a liquid crystal display, an organic electro-luminescence (EL) display, or a heads-up display (HUD). Input unit 32 is a user interface that receives an input of a user. Display unit 31 and input unit 32 may be an integrated touch panel display. Such as a proximity touch panel that can detect proximity of a hand on a touch panel or a touch pad or a position of a finger due to a hover operation, one that receives a gesture input at a position apart from a predetermined distance from the display unit may be used. Input unit 32 may have an input device such as a mouse, a stylus pen, a trackball, or the like for assisting the gesture input. A pen that emits visible light or infrared light may also be used.

Display unit 31 and input unit 32 may be physically separated from each other, instead of being an integrated touch panel display. For example, input unit 32 includes a sensor such as a camera or the like, and may be a non-contact type input device that allows a gesture operation input in the air. For example, an operation method that starts to drag with a gesture by pointing a target with a finger and making a thumb finger and an index finger close and shut together, and ends to drag with a gesture by making a thumb finger and an index finger separated from each other, is considered.

Driving support device 10 and display device 30 may be connected to each other by wire communication such as a dedicated line, a controller area network (CAN), or the like, or may be connected to each other by wire communication or wireless communication such as universal serial bus (USB), Ethernet (registered trademark), Wi-Fi (registered trademark), Bluetooth (registered trademark), or the like.

Detection unit 40 includes position information acquisition unit 41, sensor 42, speed information acquisition unit 43, and map information acquisition unit 44. Position information acquisition unit 41 acquires a current position of vehicle 1 from a global positioning system (GPS) receiver. Sensor 42 is a general term for various sensors for detecting a situation outside the vehicle and a state of vehicle 1. As a sensor for detecting a situation outside the vehicle, for example, a camera, a millimeter wave radar, a light detection and ranging (laser imaging detection and ranging, LIDAR), a temperature sensor, a pressure sensor, a humidity sensor, an illumination sensor, or the like is mounted. As a situation outside the vehicle, a road situation in which the host vehicle travels or an environmental situation including weather, and a traveling position or a traveling state of a nearby vehicle traveling at the periphery of the host vehicle are considered. Any information outside the vehicle that can be detected by the sensor may be considered. As a sensor for detecting a state of vehicle 1, for example, an acceleration sensor, a gyro sensor, a geomagnetic sensor, an inclination sensor, or the like is mounted. Speed information acquisition unit 43 acquires the current speed of vehicle 1 from a vehicle speed sensor. Map information acquiring unit 44 acquires map information around the current position of vehicle 1 from a map database. Map database may be recorded on a recording medium in vehicle 1, or may be downloaded from a map server via a network in use.

Detection unit 40 and automatic driving control device 20 are connected to each other by wire communication such as a dedicated line, a USB, an Ethernet (registered trademark), a controller area network (CAN), or the like. A configuration in which data acquired and detected by detection unit 40 is directly output from detection unit 40 to driving support device 10 may be employed.

Driving operation unit 50 includes steering 51, brake pedal 52, accelerator pedal 53, and blinker switch 54. In an automatic driving mode according to the present embodiment, acceleration, deceleration, steering, and blinker blink are a target of automatic control by automatic driving control device 20. In FIG. 1, an operation unit when these controls are performed manually is drawn. Information indicating that driving operation unit 50 is slightly moved by a driver in a manual way may output to driving support device 10.

Steering 51 is an operation unit for steering the vehicle. When steering 51 is rotated by a driver, the traveling direction of the vehicle is controlled through a steering actuator. The steering actuator can be electronically controlled by a steering electronic control unit (ECU).

Brake pedal 52 is an operation unit for decelerating vehicle 1. When brake pedal 52 is depressed by a driver, the vehicle is decelerated via a brake actuator. The brake actuator can be electronically controlled by a brake ECU.

Accelerator pedal 53 is an operation unit for accelerating vehicle 1. When accelerator pedal 53 is depressed by a driver, an engine rotation speed and/or a motor rotation speed is controlled via an accelerator actuator. In a pure gas car, the engine rotation speed is controlled. In a pure electric vehicle, the motor rotation speed is controlled. In a hybrid car, both of the engine rotation speed and the motor rotation speed are controlled. The accelerator actuator can be electronically controlled by an engine ECU and/or a motor ECU.

Blinker switch 54 is an operation unit for blinking a blinker so as to notify a course of the vehicle to the outside. When blinker switch 54 is turned on/off by a driver, the blinker is turned on/off via a blinker controller. The blinker controller includes a drive circuit such as a relay controlling power supply to a blinker lamp, or the like.

Each of the steering ECU, the brake ECU, the engine ECU, the motor ECU, and the blinker controller and automatic driving control device 20 are connected to each other by wired communication such as a CAN, a dedicated line, or the like. Each of the steering ECU, the brake ECU, the engine ECU, the motor ECU, and the blinker controller respectively transmits a state signal indicating the state of each of a steering, a brake, an engine, a motor, and a blinker lamp to automatic driving control device 20.

In the automatic driving mode, each of the steering ECU, the brake ECU, the engine ECU, and the motor ECU drives the corresponding actuator according to a control signal supplied from automatic driving control device 20. In a manual driving mode, a configuration in which an instruction is directly transferred from each of steering 51, brake pedal 52, and accelerator pedal 53 to the corresponding actuator in a mechanical way may be employed, or a configuration in which electronic control intervenes via the corresponding ECU may be employed. The blinker controller turns on/off the blinker lamp according to the control signal supplied from automatic driving control device 20 or an instruction signal from blinker switch 54.

Automatic driving control device 20 is an automatic driving controller that has an automatic driving control function, and includes control unit 21, memory unit 22, and input-output unit (I/O unit) 23. The configuration of control unit 21 may be realized by cooperation between hardware resources and software resources or only hardware resources. As the hardware resources, a processor, a read only memory (ROM), a random access memory (RAM), and other large-scale integration (LSI) circuits can be used, and as software resources, an operating system, an application, and a program such as a firmware or the like can be used. Memory unit 22 includes a non-volatile recording medium such as a flash memory or the like. Input-output unit 23 performs various communication controls according to various communication formats.

Control unit 21 calculates a control value for controlling an object of automatic control such as a traveling direction of vehicle 1 or the like by applying various parameter values collected from detection unit 40 and various ECUs to an automatic driving algorithm. Control unit 21 transfers the calculated control value to each ECU or controller of an object of control. In the present embodiment, the control value is transferred to the steering ECU, the brake ECU, the engine ECU, and the blinker controller. In a case of an electric vehicle or a hybrid car, the control value is transferred to the motor ECU instead of the engine ECU or in addition to the engine ECU.

Driving support device 10 is a human machine interface (HMI) controller for performing an interface function between vehicle 1 and a driver, and includes determination unit 11, image generation unit 12, instruction unit 13, and input-output unit 14. Determination unit 11, image generation unit 12, and instruction unit 13 can be realized by cooperation between hardware resources and software resources, or only hardware resources. As the hardware resources, a processor, a ROM, a RAM, and other LSI circuits can be used, and as software resources, an operating system, an application, and a program such as a firmware or the like can be used. Input-output unit 14 performs various communication controls according to various communication formats. Input-output unit 14 includes image output unit 14a, operation signal input unit 14b, command output unit 14c, and vehicle information input unit 14d. Image output unit 14a outputs an image generated by image generation unit 12 to display unit 31. Operation signal input unit 14b receives an operation signal that is input from input unit 32 by an operation of a driver, a passenger, or a user outside the vehicle, and outputs the operation signal to determination unit 11. Command output unit 14c outputs the command instructed by instruction unit 13 to automatic driving controller 20. Vehicle information input unit 14d receives detection data acquired by detection unit 40 or vehicle information generated by automatic driving controller 20, and outputs the detection data or the vehicle information to image generation unit 12.

Automatic driving controller 20 and HMI controller 10 are directly connected to each other by a signal line. A configuration in which automatic driving controller 20 and HMI controller 10 are connected to each other via a CAN may be employed. A configuration in which automatic driving controller 20 and HMI controller 10 are integrated into one controller may be also employed.

Figure 2:
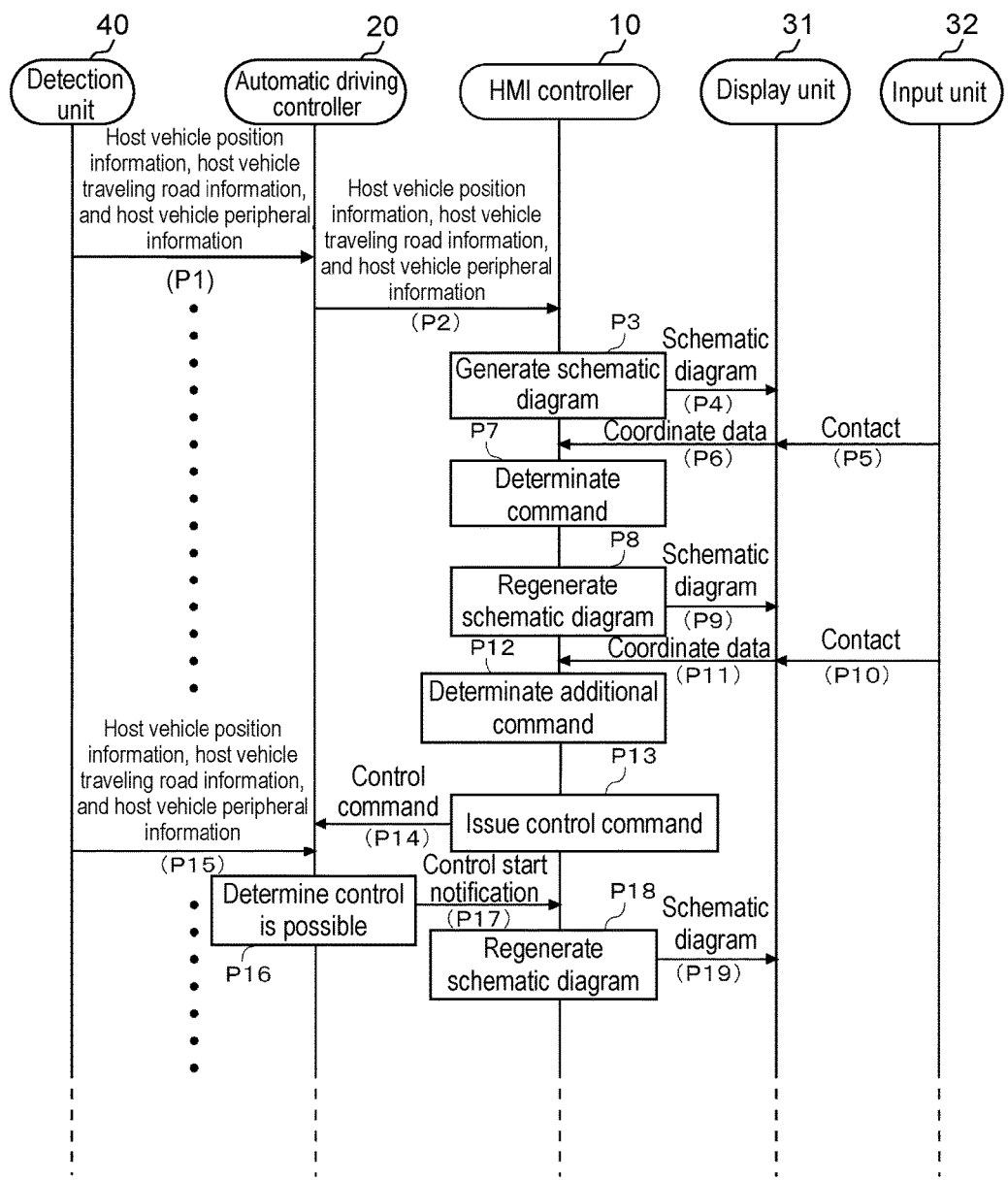
FIG. 2 is a diagram illustrating an example of a basic sequence of a detection unit, an automatic driving controller, a HMI controller, a display unit, and an input unit in FIG. 1.

FIG. 2 is a diagram illustrating an example of a basic sequence of detection unit 40, automatic driving controller 20, HMI controller 10, display unit 31, and input unit 32 in FIG. 1. Detection unit 40 detects host vehicle position information, host vehicle traveling road information, and host vehicle peripheral information, and outputs the detected information to automatic driving controller 20 (P1). Automatic driving controller 20 outputs the host vehicle position information, the host vehicle traveling road information, and the host vehicle peripheral information acquired from detection unit 40 including nearby vehicle that travels the periphery of a host vehicle, to HMI controller 10 (P2). HMI controller 10 generates a schematic diagram including the host vehicle, the nearby vehicle, and the host vehicle peripheral situation based on the information acquired from automatic driving controller 20 (P3). HMI controller 10 outputs the generated schematic diagram to display device 30, and the schematic diagram is displayed on display unit 31 (P4).

A user who views the schematic diagram displayed on display unit 31 comes into contact with input unit 32 (P5). Display unit 31 outputs coordinate data at a position at which the contact is detected to HMI controller 10 (P6). HMI controller 10 determines a type of the command based on the coordinate data acquired from display device 30 (P7). HMI controller 10 receives an additional input until a certain period of time has elapsed (P8 to P12). After determination of the command, HMI controller 10 regenerates a schematic diagram indicating that the command is being instructed (P8). HMI controller 10 outputs the regenerated schematic diagram to display device 30, and the regenerated schematic diagram is displayed on display unit 31 (P9). In a case where the command corresponding to the gesture operation by the touch of a user does not exist, HMI controller 10 generates a schematic diagram including an error message, and outputs the schematic diagram to display device 30, and the schematic diagram is displayed on display unit 31.

When a user who views the schematic diagram indicating that the command is being instructed comes into contact with input unit 32 (P10), display unit 31 outputs the coordinate data at a position at which the contact is detected to HMI controller 10 (P11). HMI controller 10 executes additional command determination processing based on the coordinate data acquired from display device 30 (P12). In a case where there is no input of a new command in the additional command processing (P12), HMI controller 10 issues a command determined in P7 to automatic driving controller 20 (P13 and P14). In a case where a new command is input in the additional command processing (P12), HMI controller 10 issues a new command to automatic driving controller 20. In a case where the new command that is input is a cancel command, HMI controller 10 cancels the issue of a command. Processing of overwriting and canceling of the original command due to a new command may be performed by automatic driving controller 20. In this case, after the command determination processing in P7 and P12, HMI controller 10 transmits the command to automatic driving controller 20, and performs processing of overwriting and canceling according to an internal state of automatic driving controller 20.

Detection unit 40 periodically detects the host vehicle position information, the host vehicle traveling road information, and the host vehicle peripheral information, and outputs the information to automatic driving controller 20 (P15). Automatic driving controller 20 determines whether or not control instructed by the command issued from HMI controller 10 is executable (P16), based on the information. In a case where it is determined that the control is executable, automatic driving controller 20 outputs a control start notification to HMI controller 10 (P17). When the control start notification is received, HMI controller 10 regenerates a schematic diagram including a message indicating that the control is being performed (P18). HMI controller 10 outputs the regenerated schematic diagram to display device 30, and the regenerated schematic diagram is displayed on the display unit 31 (P19). Although not illustrated, automatic driving controller 20 calculates a specific control value for controlling driving operation unit 50 that performs the issued command by applying various parameter values collected from detection unit 40 or various ECUs to an automatic driving algorithm, and transfers the control value to the ECU or controller of each control target, the control value being an automatic control target such as a traveling direction of vehicle 1 or the like. Driving operation unit 50 operates based on the specific control value. When a predetermined control value or the detection data acquired by detection unit 40 is a predetermined value (in a predetermined range), and when automatic driving controller 20 determines that a condition of the issued command is satisfied, driving operation unit 50 determines that performing of the command is completed.

When a control completion notification is received from automatic driving controller 20, HMI controller 10 generates a schematic diagram including a message indicating that control is completed, and outputs the generated schematic diagram to display device 30. During a period for which an operation from a user is not received, HMI controller 10 generates a schematic diagram including a message indicating that an operation is not received, and outputs the generated schematic diagram to display device 30.

Figure 3:
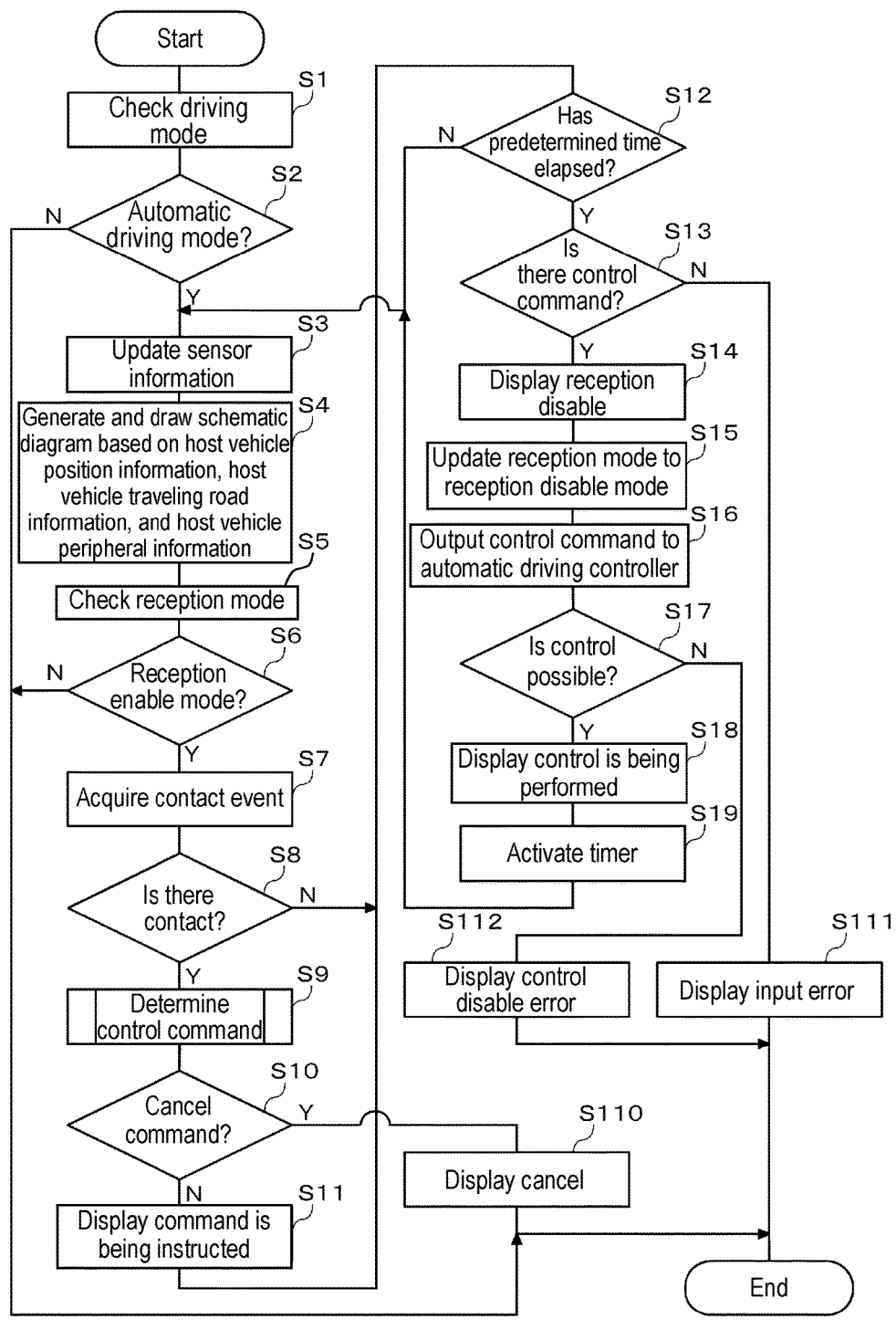
FIG. 3 is a diagram illustrating an example of a basic flowchart for explaining processing in the HMI controller in FIG. 1.

FIG. 3 is a diagram illustrating an example of a basic flowchart for explaining processing of HMI controller 10 in FIG. 1. Determination unit 11 of HMI controller 10 checks whether or not a driving mode is an automatic driving mode or a manual driving mode (S1). In the manual driving mode (N in S2), the process ends. In a case of the automatic driving mode (Y in S2), processing is performed as follows.

Sensor information that is input from detection unit 40 to automatic driving controller 20 is updated at any time (S3). Image generation unit 12 of HMI controller 10 generates a schematic diagram including the host vehicle, a nearby vehicle, and the host vehicle peripheral situation based on the host vehicle position information, the host vehicle traveling road information, and the host vehicle peripheral information including a nearby vehicle traveling the periphery of a host vehicle that are input from automatic driving controller 20, and draws the generated schematic diagram on display unit 31 (S4). Determination unit 11 checks whether or not a reception mode is a reception enable mode in which an operation from a user can be received or a reception disable mode in which an operation from a user cannot be received (S5). In a case where the reception mode is the reception disable mode (N in S6), the process ends. In a case where the reception mode is the reception enable mode (Y in S6), determination unit 11 determines whether or not there is a contact to input unit 32 by a user (S7). In a case where there is no contact to input unit 32 by a user (N in S8), predetermined-time elapse determination processing (S12) to be described later is performed. In a case where there is a contact to input unit 32 by a user (Y in S8), determination unit 11 determines a control command according to a gesture operation input by a user (S9). The details of the determination processing will be described later.

In a case where the control command determined in step S9 is not a cancel command (N in S10), image generation unit 12 displays that the command is being instructed on display unit 31 (S11). When a predetermined time has elapsed after the control command is determined (Y in S12), in a case where there is a control command determined in step S9 (Y in S13), operation reception disable is displayed on display unit 31 (S14), determination unit 11 updates the reception mode from the reception enable mode to the reception disable mode (S15), and instruction unit 13 outputs the determined control command to automatic driving controller 20 (S16). Until a predetermined time has elapsed (N in S12), the process transitions to step S3.

In step S10, in a case where the determined control command is a cancel command (Y in S10), cancel is displayed (S110), and the process ends. In step S13, in a case where there is no control command determined in step S9, an input error is displayed (S111), and the process ends.

Automatic driving controller 20 periodically detects the host vehicle position information, the host vehicle traveling road information, and the host vehicle peripheral information from detection unit 40. Since the host vehicle peripheral situation constantly changes, after the control command is output to automatic driving controller 20, there is a case where it is determined that the control command is not executable. For example, after a following instruction, there is a case where other cars interrupt between the host vehicle and a nearby vehicle. In a case where it is determined that the control command is executable by automatic driving controller 20 (Y in S17), image generation unit 12 displays that the control is being performed on display unit 31 (S18), and starts counting by activating a timer (S19). In a case where it is determined that the control is not executable by automatic driving controller 20 (N in S17), image generation unit 12 displays a control disable error on display unit 31 (S112).

Figure 4:
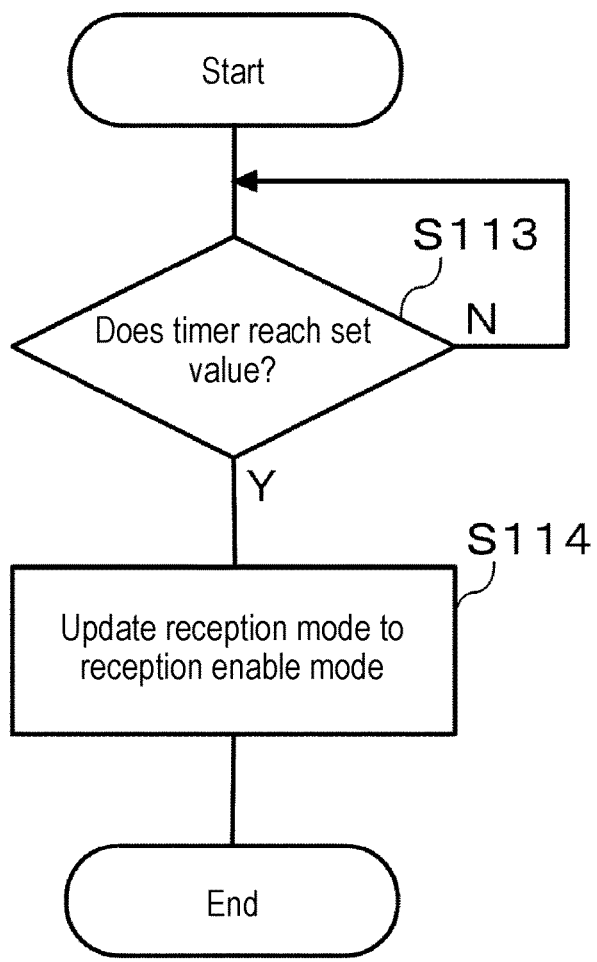
FIG. 4 is a flowchart for explaining update processing of a reception mode according to the embodiment of the present invention.

FIG. 4 is a flowchart for explaining update processing of a reception mode. When a count value of the timer reaches a set value (for example, 10 seconds) (Y in S113), determination unit 11 of HMI controller 10 updates the reception mode from the reception disable mode to the reception enable mode (S114). The count value of the timer may be changed according to the host vehicle peripheral situation. When a notification indicating completion of the control is received from automatic driving controller 20, or when it is determined that the control according to the control command is completed based on behavior of vehicle 1, determination unit 11 may update the reception mode from the reception disable mode to the reception enable mode.

Hereinafter, in this embodiment, as a control command, an example in which a control command for instructing following traveling is issued will be described. The following traveling is a traveling form in which a host vehicle travels while keeping a constant inter-vehicle distance from a preceding vehicle. The following traveling has an effect of reducing wind pressure of the following vehicle and improving fuel efficiency of the following vehicle. A user inputs a gesture operation for instructing following traveling to input unit 32. A specific example of the gesture operation will be described later.

Figure 5:
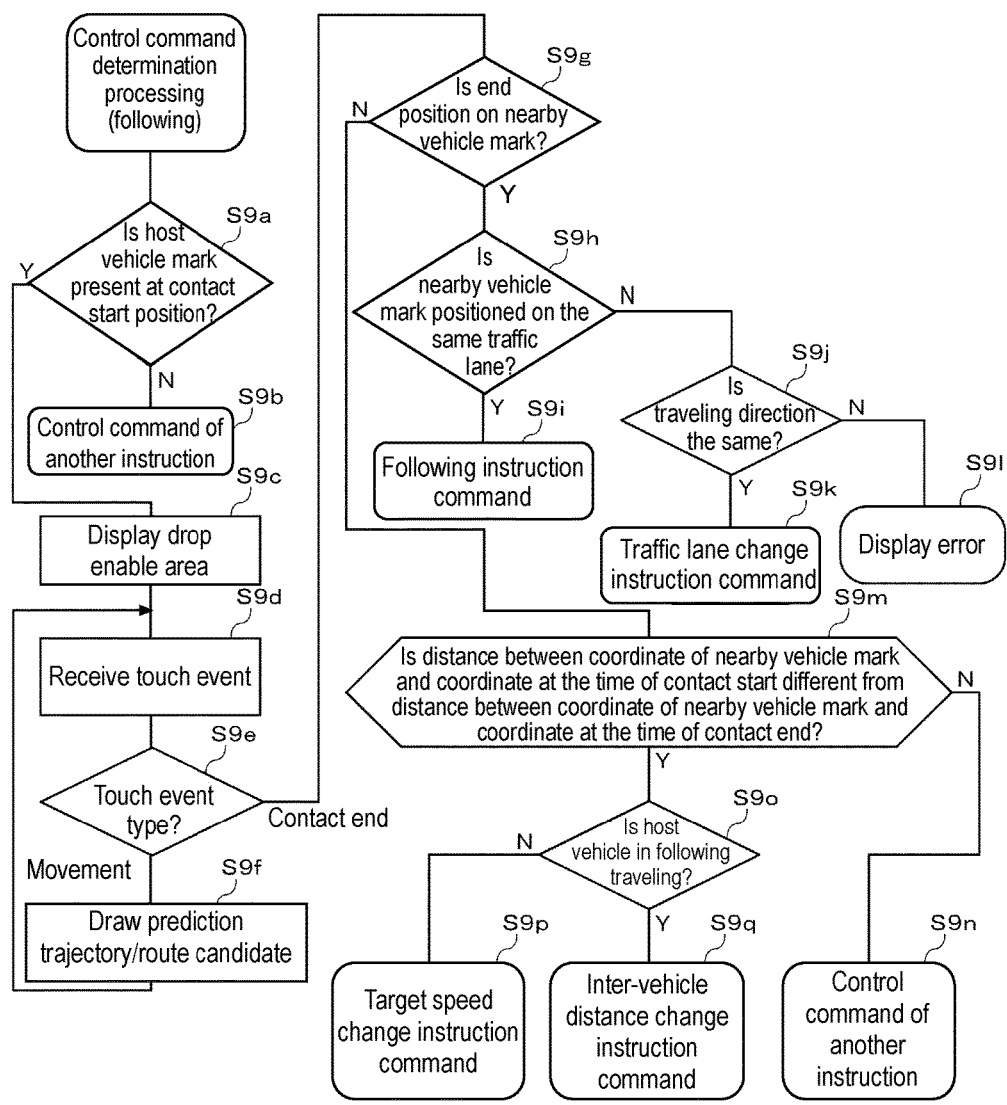
FIG. 5 is a flowchart illustrating an example of determination processing in a case where a gesture operation for instructing following traveling is input in step S9 of FIG. 3.

FIG. 5 is a flowchart illustrating an example of determination processing in a case where a gesture operation for instructing following traveling is input in step S9 of FIG. 3. Determination unit 11 of HMI controller 10 determines whether or not a host vehicle mark is present at a contact start position (S9*a*). In a case where the host vehicle mark is not present at the contact start position (N in S9*a*), determination unit 11 determines that the gesture operation is a control command of another instruction other than a following instruction (S9*b*). In a case where the host vehicle mark is present at the contact start position (Y in S9*a*), image generation unit 12 draws a drop enable area in the schematic diagram, and displays the area on display unit 31 (S9*c*). A specific example of the drop enable area will be described later.

Determination unit 11 receives a touch event generated in input unit 32 (S9*d*), and determines the type of the touch event (S9*e*). In a case where the type of the touch event is a movement (movement in S9*e*), image generation unit 12 draws a prediction trajectory/route candidate of vehicle 1 in the schematic diagram, and the prediction trajectory/route candidate of vehicle 1 is displayed on display unit 31 (S9*f*).

In a case where the type of the touch event is a contact end (a contact end in S9*e*), determination unit 11 determines whether or not a contact end position is on a nearby vehicle mark (S9g). In a case where the contact end position is on a nearby vehicle mark (Y in S9g), determination unit 11 determines whether or not the nearby vehicle mark is positioned on the same lane on which the host vehicle mark is positioned (S9h). In a case where the nearby vehicle mark is positioned on the same lane on which the host vehicle mark is positioned (Y in S9h), determination unit 11 determines that the gesture operation is a following instruction command (S9i). In a case where the nearby vehicle mark is not positioned on the same lane on which the host vehicle mark is positioned (N in S9h), determination unit 11 determines whether or not a traveling direction of the host vehicle is the same as a traveling direction of the nearby vehicle (S9j). In a case where the traveling direction of the host vehicle is the same as the traveling direction of the nearby vehicle (Y in S9j), determination unit 11 determines that the gesture operation is a traffic lane change instruction command for instructing traffic lane change to the lane on which the nearby vehicle mark is positioned (S9k). In a case where the traveling direction of the host vehicle is not the same as the traveling direction of the nearby vehicle (N in S9j), image generation unit 12 displays an error message on display unit 31 (S9l).

In a case where the contact end position is not on the nearby vehicle mark in step S9g (N in S9g), determination unit 11 determines whether or not a distance between a coordinate of the nearby vehicle mark and a coordinate at the time of contact start is different from a distance between a coordinate of the nearby vehicle mark and a coordinate at the time of contact end (S9m). In a case where the two distances are the same (N in S9m), determination unit 11 determines that the gesture operation is a control command of another instruction other than a following instruction (S9n). In a case where the two distances are different from each other (Y in S9m), determination unit 11 determines whether or not the host vehicle is traveling following the nearby vehicle (S9o). In a case where the host vehicle is not traveling following the nearby vehicle (N in S9o), determination unit 11 determines that the gesture operation is a target speed change instruction command (S9p). In a case where the host vehicle is traveling following the nearby vehicle (Y in S9o), determination unit 11 determines that the gesture operation is an inter-vehicle distance change instruction command (S9q).

Hereinafter, a specific example of the gesture operation that is used at the time of following will be described. In the following examples, it is assumed that a touch panel display in which display unit 31 and input unit 32 are integrated is used.

Figure 6:
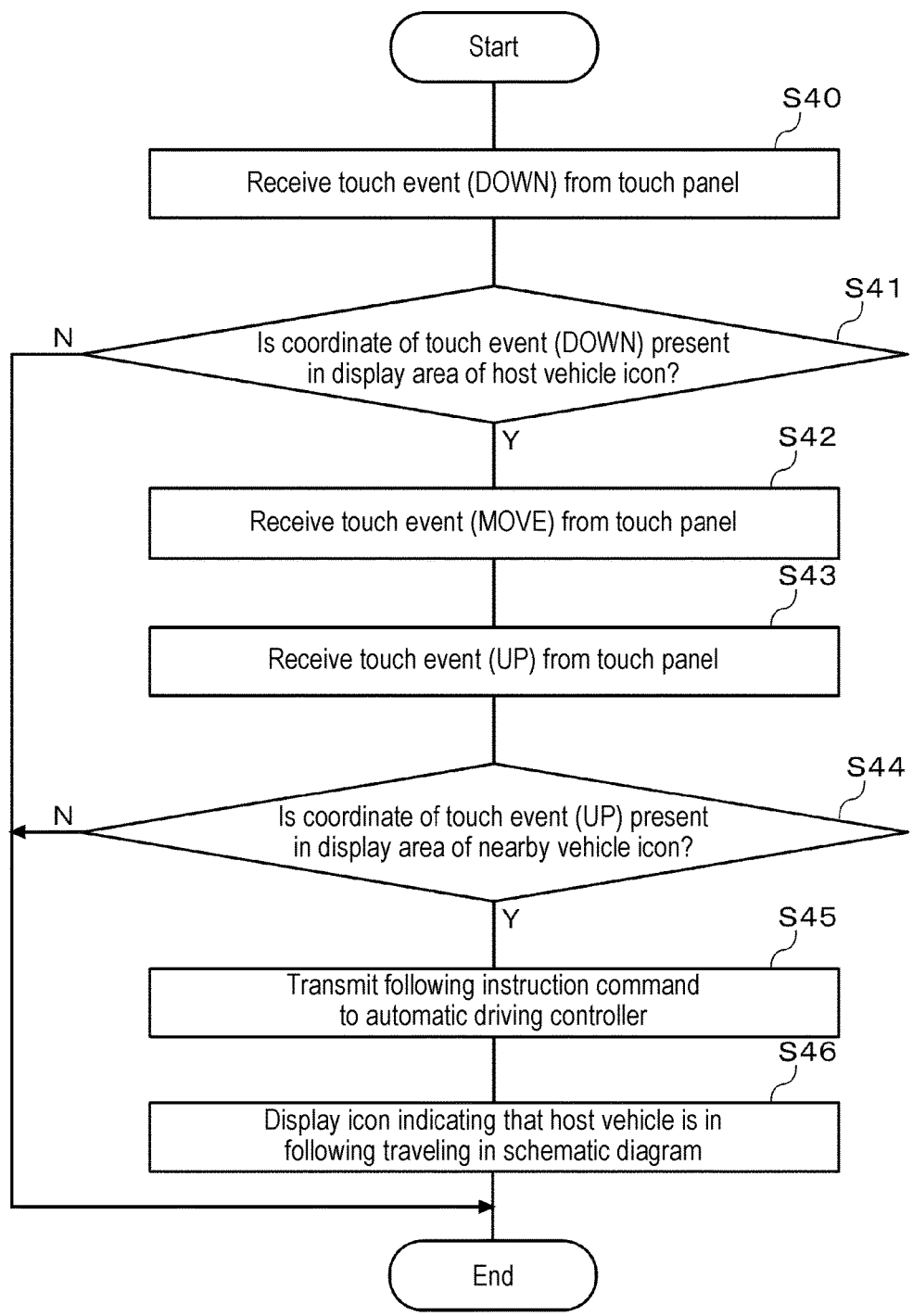
FIG. 6 is a flowchart illustrating a first processing example of issuing a following instruction command by a gesture operation according to the embodiment of the present invention.

FIG. 6 is a flowchart illustrating a first processing example of issuing a following instruction command by a gesture operation. Determination unit 11 of HMI controller 10 receives a touch event (DOWN) from the touch panel (S40). The touch event (DOWN) is an event representing a contact state change on the touch panel from a non-contact state to a contact state by a finger or a pen. Determination unit 11 determines whether or not a coordinate detected by the touch event (DOWN) is present in a display area of the host vehicle icon (S41). In a case where the coordinate detected by the touch event (DOWN) is present outside the display area of the host vehicle icon (N in S41), it is determined that the gesture operation is not a following instruction, and the process ends.

In a case where the coordinate detected by the touch event (DOWN) is present in the display area of the host vehicle icon (Y in S41), determination unit 11 receives a touch event (MOVE) from the touch panel (S42). The touch event (MOVE) is an event representing a change from a contact state on a certain point of the touch panel to a contact state on another point of the touch panel by a finger or a pen. Then, determination unit 11 receives a touch event (UP) from the touch panel (S43). The touch event (UP) is an event representing a contact state change on the touch panel from a contact state to a non-contact state by a finger or a pen.

Determination unit 11 determines whether or not a coordinate detected by the touch event (UP) is present in a display area of the nearby vehicle icon (S44). In a case where the coordinate detected by the touch event (UP) is present in the display area of the nearby vehicle icon (Y in S44), instruction unit 13 issues a following instruction command for instructing the host vehicle to travel following the nearby vehicle according to the nearby vehicle icon, to automatic driving controller 20 (S45). Image generation unit 12 displays a following icon indicating that the host vehicle is in traveling following the nearby vehicle at a position between the host vehicle icon and the nearby vehicle icon in the schematic diagram (S46). In a case where the coordinate detected by the touch event (UP) is present outside the display area of the nearby vehicle icon (N in S44), it is determined that the gesture operation is not a following instruction command, and the process ends.

Figure 7:
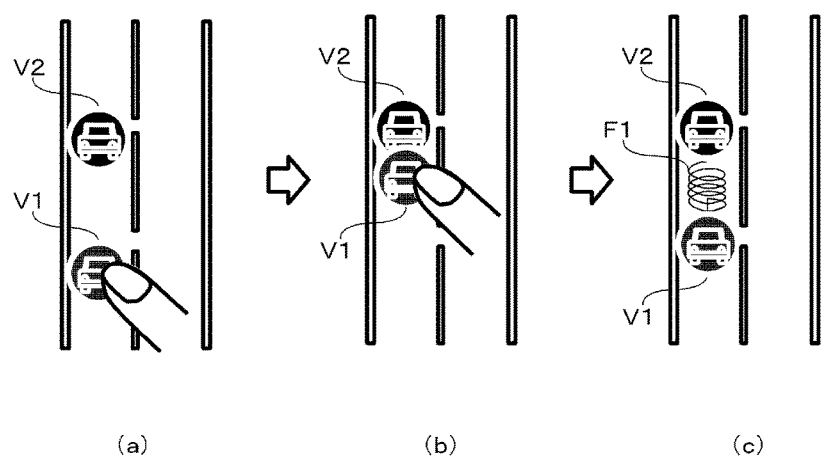
FIG. 7 is a diagram illustrating an example of a gesture operation according to the flowchart of FIG. 6.

FIG. 7 is a diagram illustrating an example of a gesture operation according to the flowchart of FIG. 6. In the schematic diagram illustrated in (a) of FIG. 7, a host vehicle icon V1 and a nearby vehicle icon V2 are displayed on the same lane. As display forms of the host vehicle, the nearby vehicle, and a peripheral situation including a road, various display forms are considered. A real photographed image may be used, and a fine CG image or an animation image may be used. Display of the host vehicle is not limited to an icon, and the host vehicle may be displayed as a more simple mark or character, or may be displayed as a real photographed image. In other words, there is no problem as long as the host vehicle is displayed on a screen as an object in any display form. The same is true in display of the nearby vehicle.

When a driver is about to travel following the nearby vehicle, as illustrated in (a) of FIG. 7, a driver drags the host vehicle icon V1, and as illustrated in (b) of FIG. 7, drops the host vehicle icon V1 onto the nearby vehicle icon V2. Accordingly, a following instruction command issued, and as shown in (c) of FIG. 7, a following icon F1 indicating that the host vehicle is in traveling following the nearby vehicle is displayed at a position between the host vehicle icon V1 and the nearby vehicle icon V2.

Figure 8:
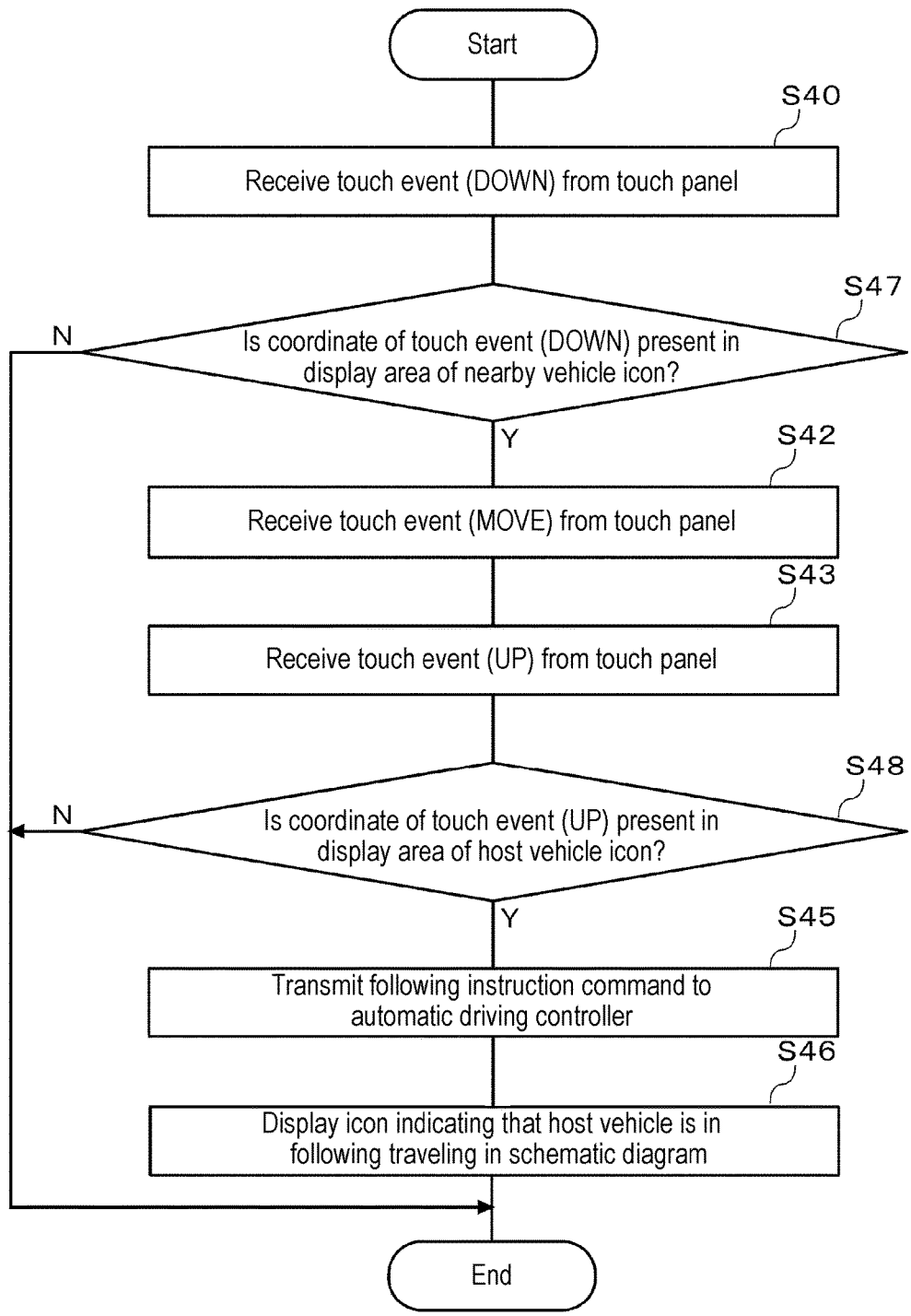
FIG. 8 is a flowchart illustrating a second processing example of issuing a following instruction command by a gesture operation according to the embodiment of the present invention.

FIG. 8 is a flowchart illustrating a second processing example of issuing a following instruction command by a gesture operation. The second processing example is an example of dragging and dropping a nearby vehicle icon. Determination unit 11 of HMI controller 10 receives a touch event (DOWN) from the touch panel (S40). Determination unit 11 determines whether or not a coordinate detected by the touch event (DOWN) is present in a display area of the nearby vehicle icon (S47). In a case where the coordinate detected by the touch event (DOWN) is present outside the display area of the nearby vehicle icon (N in S47), it is determined that the gesture operation is not a following instruction, and the process ends.

In a case where the coordinate detected by the touch event (DOWN) is present in the display area of the nearby vehicle icon (Y in S47), determination unit 11 receives a touch event (MOVE) from the touch panel (S42). Then, determination unit 11 receives a touch event (UP) from the touch panel (S43). Determination unit 11 determines whether or not a coordinate detected by the touch event (UP) is present in a display area of the host vehicle icon (S48). In a case where the coordinate detected by the touch event (UP) is present in the display area of the host vehicle icon (Y in S48), instruction unit 13 issues a following instruction command for instructing the host vehicle to travel following the nearby vehicle corresponding to the nearby vehicle icon to automatic driving controller 20 (S45). Image generation unit 12 displays a following icon indicating that the host vehicle is traveling following the nearby vehicle, at a position between the host vehicle icon and the nearby vehicle icon in the schematic diagram (S46). In a case where the coordinate detected by the touch event (UP) is present outside the display area of the host vehicle icon (N in S48), it is determined that the gesture operation is not a following instruction command, and the process ends.

Figure 9:
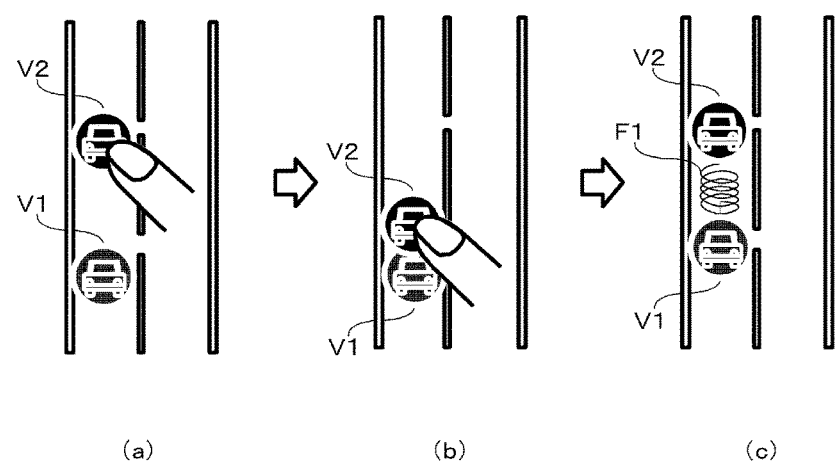
FIG. 9 is a diagram illustrating an example of a gesture operation according to the flowchart of FIG. 8.

FIG. 9 is a diagram illustrating an example of a gesture operation according to the flowchart of FIG. 8. In a case where a driver to travel following a nearby vehicle, as illustrated in (a) of FIG. 9, a driver drags a nearby vehicle icon V2, and as illustrated in (b) of FIG. 9, drops the nearby vehicle icon V2 onto a host vehicle icon V1. Accordingly, a following instruction command is issued, and as illustrated in (c) of FIG. 9, a following icon F1 indicating that the host vehicle is traveling following the nearby vehicle is displayed at a position between the host vehicle icon V1 and the nearby vehicle icon V2. The following icon F1 may be an icon representing a linking state of the host vehicle and the nearby vehicle such as a spring or a string, or an arrow pointing two parties, or may be a character description such as following traveling. The following icon F1 may be displayed at a position other than a position between the host vehicle icon and the nearby vehicle icon.

Figure 10:
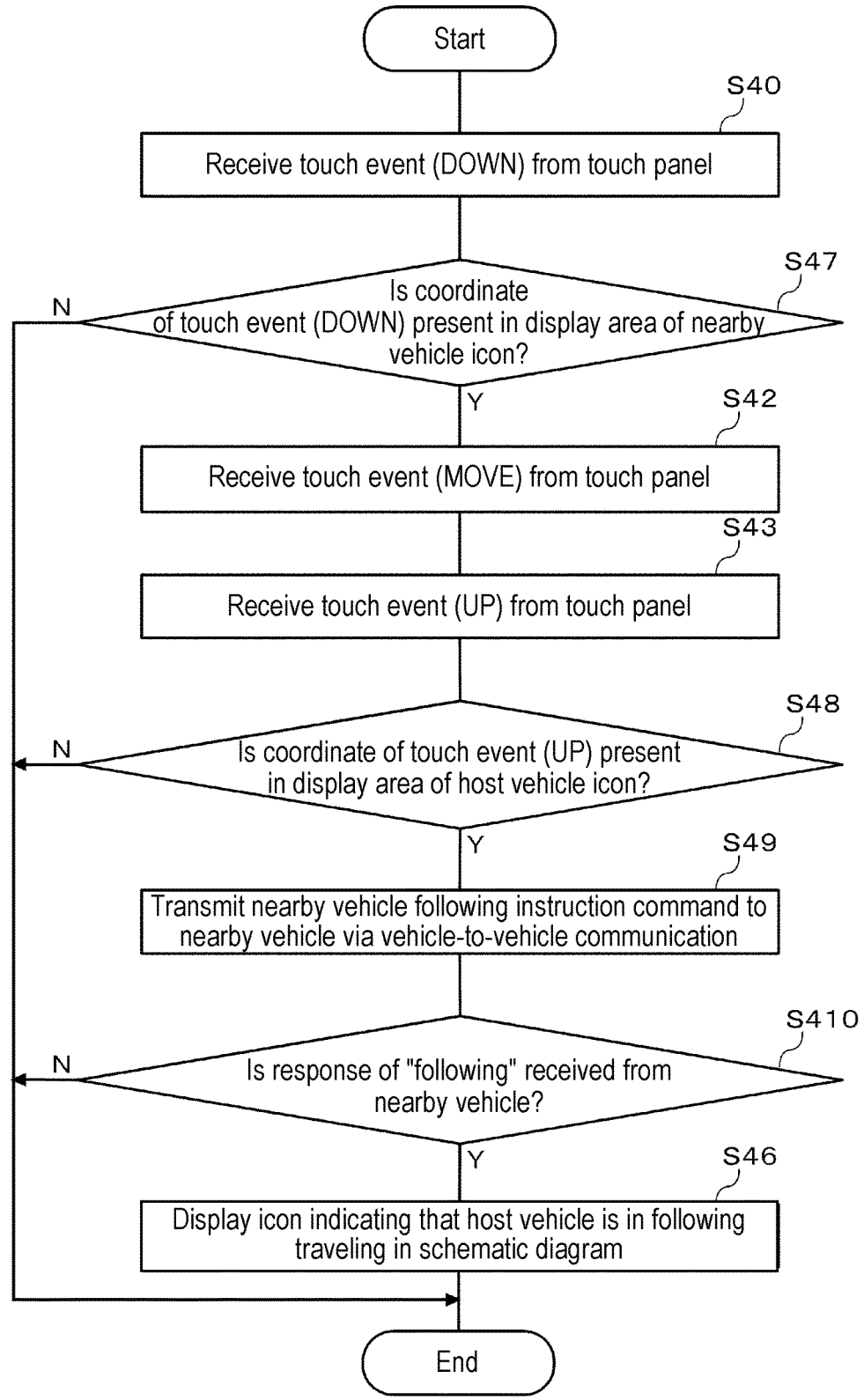
FIG. 10 is a flowchart illustrating a third processing example of issuing a following instruction command by a gesture operation according to the embodiment of the present invention.

FIG. 10 is a flowchart illustrating a third processing example of issuing a following instruction command by a gesture operation. The third processing example is an example of instructing a nearby vehicle to travel following the host vehicle. Processes from step S40 to step S48 are the same as those of the flowchart of FIG. 8. In a case where the coordinate detected by the touch event (UP) is present in the display area of a host vehicle icon (Y in S48), instruction unit 13 transmits a nearby vehicle following instruction command for instructing the nearby vehicle corresponding to the nearby vehicle icon to travel following the host vehicle, to the nearby vehicle via a vehicle-to-vehicle communication (S49). For example, as a vehicle-to-vehicle communication, a vehicle-to-vehicle communication based on intelligent transport systems (ITS) can be used.

In a case where the coordinate detected by the touch event (UP) is present outside the display area of the host vehicle icon (N in S48), the nearby vehicle following instruction command is not transmitted.

HMI controller 10 of the nearby vehicle receives the nearby vehicle following instruction command, and replies "following" or "non-following" according to an operation of a driver of the nearby vehicle, to HMI controller 10 that is a transmission destination of the command. Determination unit 11 of HMI controller 10 of the host vehicle determines whether or not a response of "following" is received from the nearby vehicle (S410). In a case where a response of "following" is received from the nearby vehicle (Y in S410), image generation unit 12 displays a following icon indicating that the nearby vehicle is traveling following the host vehicle, at a position between the host vehicle icon and the nearby vehicle icon in the schematic diagram (S46). In a case where a response of "following" is not received from the nearby vehicle (N in S410), nearby vehicle following traveling is not established, and the process of step S46 is skipped.

Figure 11:
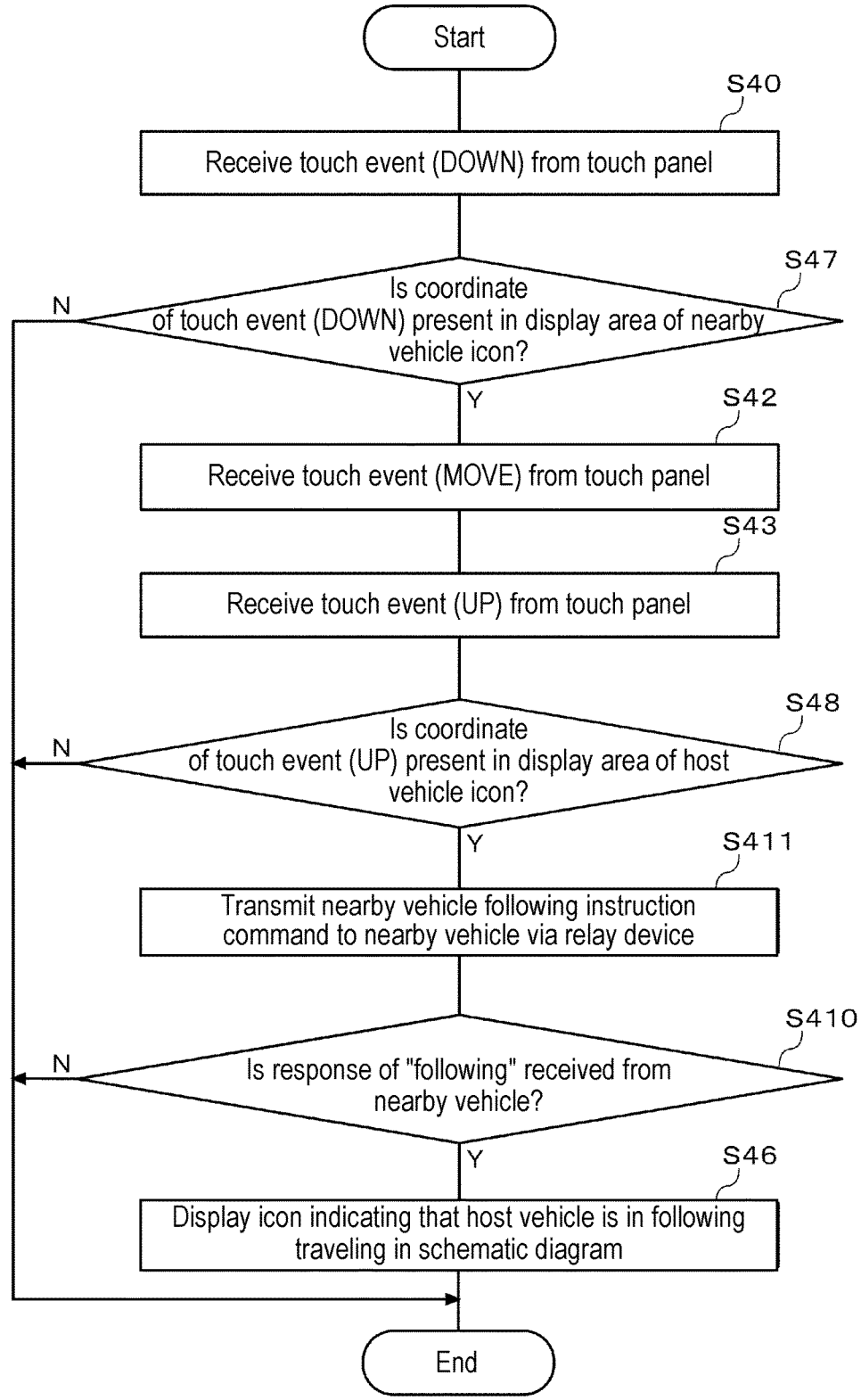
FIG. 11 is a flowchart illustrating a modification example of the third processing example of issuing a following instruction command by a gesture operation according to the embodiment of the present invention.

FIG. 11 is a flowchart illustrating a modification example of the third processing example of issuing a following instruction command by a gesture operation. In the modification example, the process of step S49 in the flowchart of FIG. 10 is replaced to the process of step S411. In other words, in a case where the coordinate detected by the touch event (UP) is present in the display area of a host vehicle icon (Y in S48), instruction unit 13 transmits a nearby vehicle following instruction command for instructing the nearby vehicle corresponding to the nearby vehicle icon to travel following the host vehicle, to the nearby vehicle via a relay device (S411). The relay device may be a road-side device, or a relay server on the Internet. As an example of the former, a road-to-vehicle communication based on the ITS can be used, and the nearby vehicle following instruction command is transmitted from the host vehicle to the nearby vehicle via the road-to-vehicle communication between the host vehicle and the road-side device and the road-to-vehicle communication between the road-side device and the nearby vehicle.

Figure 12:
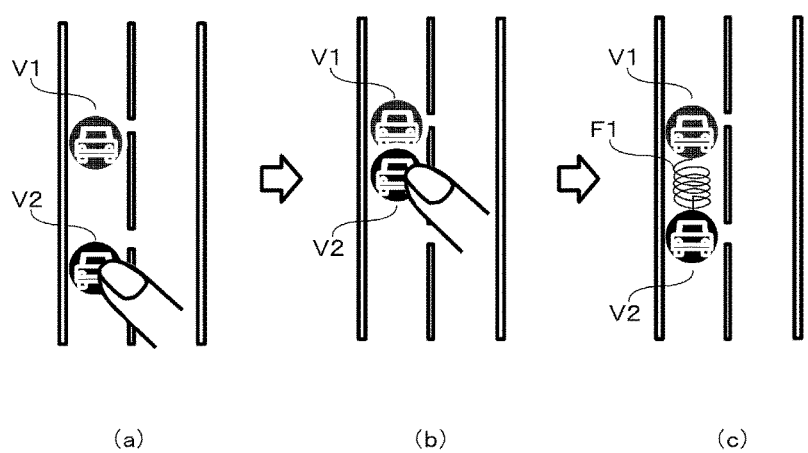
FIG. 12 is a diagram illustrating an example of a gesture operation according to the flowchart of FIG. 10 and FIG. 11 according to the embodiment of the present invention.

FIG. 12 is a diagram illustrating an example of a gesture operation according to the flowcharts of FIG. 10 and FIG. 11. In a case where a driver tries a nearby vehicle (following vehicle) to travel following host vehicle, as illustrated in (a) of FIG. 12, a driver drags a nearby vehicle icon V2, and as illustrated in (b) of FIG. 12, drops the nearby vehicle icon V2 onto a host vehicle icon V1. Accordingly, a nearby vehicle following instruction command is issued, and when nearby vehicle following traveling is established, as illustrated in (c) of FIG. 12, a following icon F1 indicating that the nearby vehicle is traveling following the host vehicle is displayed at a position between the host vehicle icon V1 and the nearby vehicle icon V2. As a gesture operation for issuing the following instruction command, other than the above operation, an operation that links the host vehicle icon and the nearby vehicle icon may be used.

Figure 13:
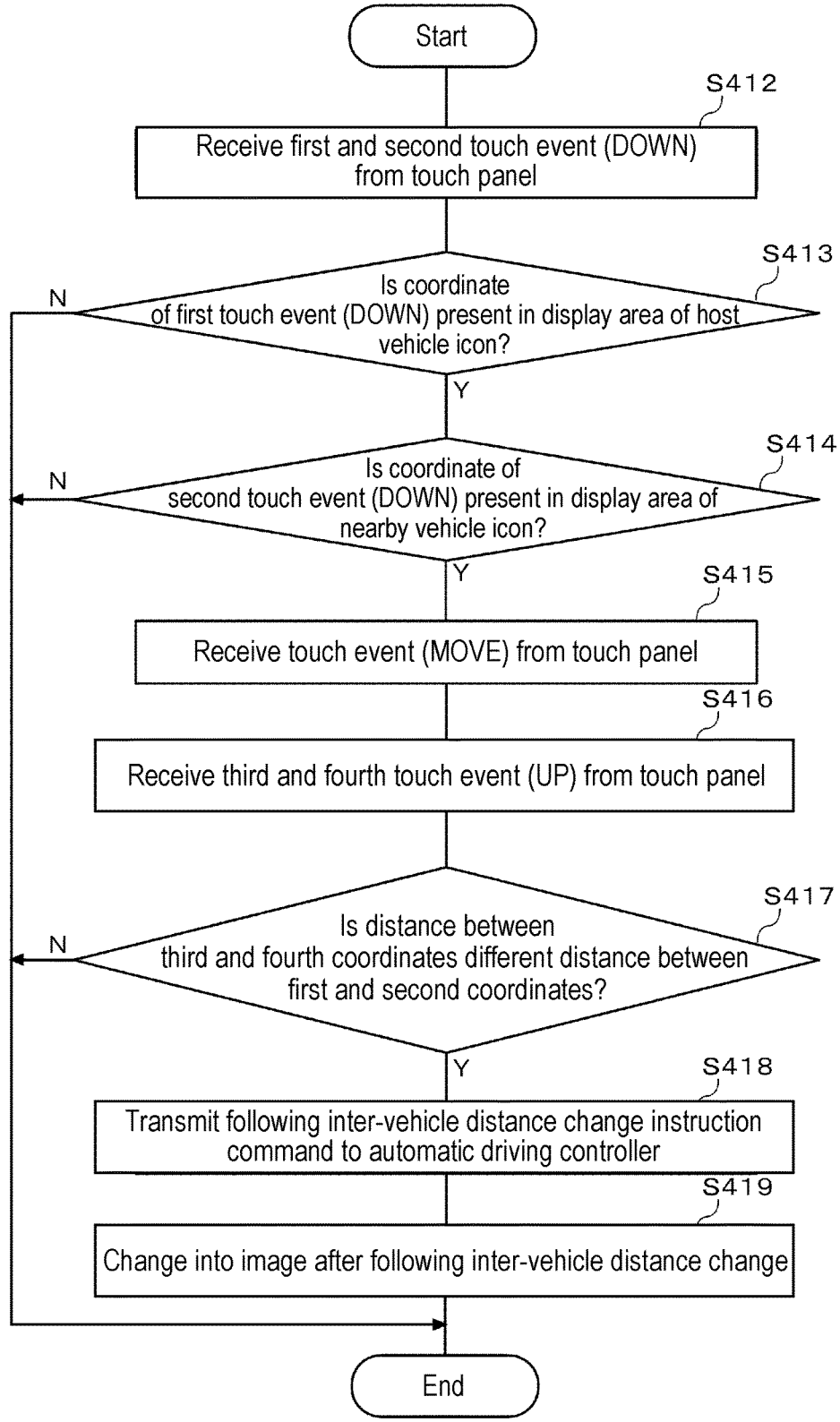
FIG. 13 is a flowchart illustrating a first processing example of issuing a following inter-vehicle distance change instruction command for changing an inter-vehicle distance during following traveling by a gesture operation according to the embodiment of the present invention.

FIG. 13 is a flowchart illustrating a first processing example of issuing a following inter-vehicle distance change instruction command for changing an inter-vehicle distance during following traveling by a gesture operation. In this processing example, it is assumed that a host vehicle is traveling following a nearby vehicle or a nearby vehicle is traveling following a host vehicle. Determination unit 11 of HMI controller 10 receives two-point first and second touch event (DOWN) from the touch panel (S412). Determination unit 11 determines whether or not a coordinate detected by a first touch event (DOWN) is present in a display area of the host vehicle icon (S413). In a case where the coordinate detected by the first touch event (DOWN) is present outside the display area of the host vehicle icon (N in S413), it is determined that the gesture operation is not an inter-vehicle distance change instruction, and the process ends.

In a case where the coordinate detected by the first touch event (DOWN) is present in the display area of the host vehicle icon (Y in S413), determination unit 11 determines whether or not a coordinate detected by a second touch event (DOWN) is present in a display area of the nearby vehicle icon (S414). In a case where the coordinate detected by the second touch event (DOWN) is present outside the display area of the nearby vehicle icon (N in S414), it is determined that the gesture operation is not an inter-vehicle distance change instruction, and the process ends.

In a case where the coordinate detected by the second touch event (DOWN) is present in the display area of the nearby vehicle icon (Y in S414), determination unit 11 receives a touch event (MOVE) from the touch panel (S415). Then, determination unit 11 receives two-point third and fourth touch event (UP) from the touch panel (S416). Determination unit 11 compares the distance between a third coordinate and a fourth coordinate detected by the third and fourth touch event (UP) and the distance between a first coordinate and a second coordinate detected by the first and second touch event (DOWN) (S417). In a case where the two distances are different from each other (Y in S417), instruction unit 13 issues a following inter-vehicle distance change instruction command for changing the distance between the host vehicle and the nearby vehicle in following traveling to automatic driving controller 20 (S418). Image generation unit 12 changes the inter-vehicle distance between the host vehicle icon and the nearby vehicle icon in the schematic diagram (S419). In a case where the two distances are the same (N in S417), it is determined that the gesture operation is not an inter-vehicle distance change instruction, and the process ends.

Figure 14:
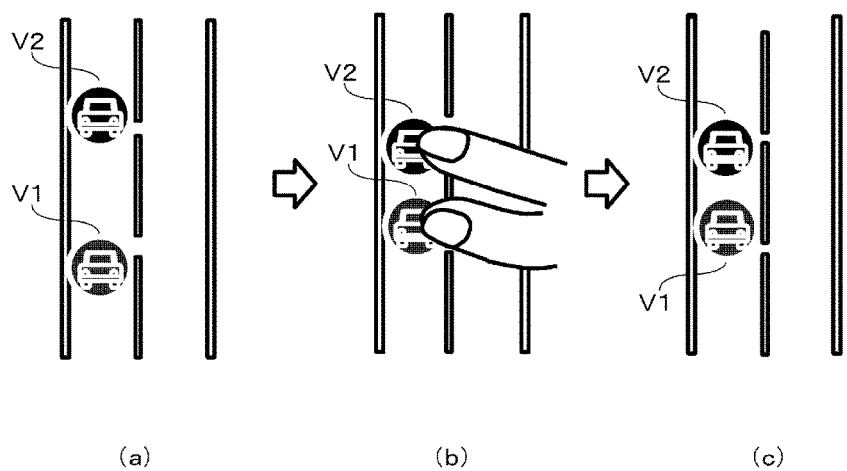
FIG. 14 is a diagram illustrating an example of a gesture operation according to the flowchart of FIG. 13.

FIG. 14 is a diagram illustrating an example of a gesture operation according to the flowchart of FIG. 13. In a case where a driver is about to change the inter-vehicle distance between the host vehicle and the nearby vehicle in following traveling, as illustrated in (a) of FIG. 14, a driver touches the host vehicle icon V1 and the nearby vehicle icon V2 with two fingers. In this state, as illustrated in (b) of FIG. 14, when a driver pinches in the inter-vehicle distance, an inter-vehicle distance change instruction command for shortening the inter-vehicle distance between the host vehicle and the nearby vehicle is issued. The inter-vehicle distance after change is determined according to the distance between the host vehicle icon V1 and the nearby vehicle icon V2. In (c) of FIG. 14, a schematic diagram after the inter-vehicle distance changes is illustrated, and the inter-vehicle distance between the host vehicle icon V1 and the nearby vehicle icon V2 is shorten, compared to the inter-vehicle distance in (a) of FIG. 14. In a state where a driver touches the host vehicle icon V1 and the nearby vehicle icon V2 with two fingers, when a driver pinches out the inter-vehicle distance between the host vehicle icon V1 and the nearby vehicle icon V2, an inter-vehicle distance change instruction command for increasing the inter-vehicle distance between the host vehicle and the nearby vehicle is issued.

Figure 15:
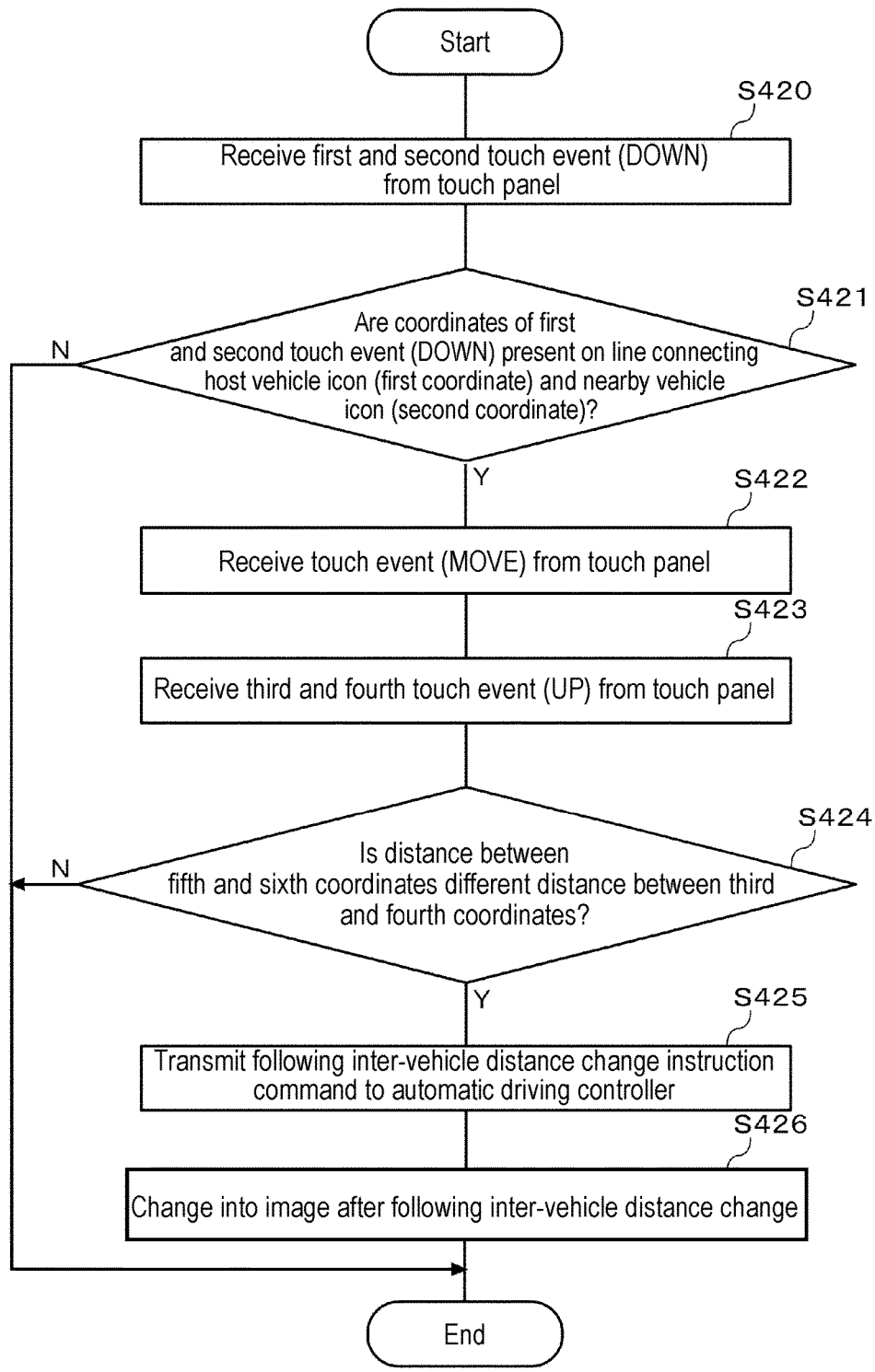
FIG. 15 is a flowchart illustrating a second processing example of issuing a following inter-vehicle distance change instruction command for changing an inter-vehicle distance during following traveling by a gesture operation according to the embodiment of the present invention.

FIG. 15 is a flowchart illustrating a second processing example of issuing a following inter-vehicle distance change instruction command for changing an inter-vehicle distance during following traveling by a gesture operation. Even in this processing example, it is assumed that host vehicle is traveling following a nearby vehicle or a nearby vehicle is traveling following host vehicle. Determination unit 11 of HMI controller 10 receives two-point first and second touch event (DOWN) from the touch panel (S420). Determination unit 11 determines whether or not coordinates detected by the two-point first and second touch event (DOWN) are present on a line connecting a position of a host vehicle icon (a first coordinate) and a position of a nearby vehicle icon (a second coordinate) (S421). In a case where the coordinates detected by the two-point first and second touch event (DOWN) are not present on the line (N in S421), it is determined that the gesture operation is not an inter-vehicle distance change instruction, and the process ends.

In a case where the coordinates detected by the two-point touch event (DOWN) are present on the line (Y in S421), determination unit 11 receives a touch event (MOVE) from the touch panel (S422). Then, determination unit 11 receives two-point third and fourth touch event (UP) from the touch panel (S423). Determination unit 11 compares the distance between a fifth coordinate and a sixth coordinate detected by the third and fourth touch event (UP) and the distance between a third coordinate and a fourth coordinate detected by the first and second touch event (DOWN) (S424). In a case where the two distances are different from each other (Y in S424), instruction unit 13 issues a following inter-vehicle distance change instruction command for changing the distance between the host vehicle and the nearby vehicle in following traveling to automatic driving controller 20 (S425). Image generation unit 12 changes the inter-vehicle distance between the host vehicle icon and the nearby vehicle icon in the schematic diagram (S426). In a case where the two distances are the same (N in S424), it is determined that the gesture operation is not an inter-vehicle distance change instruction, and the process ends.

Figure 16:
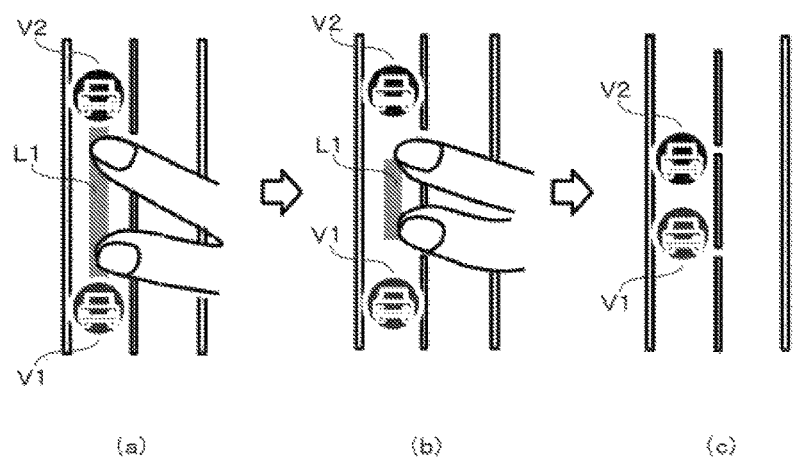
FIG. 16 is a diagram illustrating an example of a gesture operation according to the flowchart of FIG. 15.

FIG. 16 is a diagram illustrating an example of a gesture operation according to the flowchart of FIG. 15. In a case where a driver is about to change the inter-vehicle distance between a host vehicle and a nearby vehicle in following traveling, as illustrated in (a) of FIG. 16, a driver touches two points on an imaginary line L1 between a host vehicle icon V1 and a nearby vehicle icon V2 with two fingers. In this state, as illustrated in (b) of FIG. 16, when a driver pinches in the inter-vehicle distance, an inter-vehicle distance change instruction command for shortening the inter-vehicle distance between the host vehicle and the nearby vehicle is issued. The inter-vehicle distance after change is determined according to the distance between the host vehicle icon V1 and the nearby vehicle icon V2. In (c) of FIG. 16, a schematic diagram after the inter-vehicle distance changes is illustrated, and the inter-vehicle distance between the host vehicle icon V1 and the nearby vehicle icon V2 (a) is shorten, compared to the inter-vehicle distance in (a) of FIG. 16. In a state where a driver touches the two points on the imaginary line L1 between the host vehicle icon V1 and the nearby vehicle icon V2 with two fingers, when a driver pinches out the inter-vehicle distance between the host vehicle icon V1 and the nearby vehicle icon V2, an inter-vehicle distance change instruction command for increasing the inter-vehicle distance between the host vehicle and the nearby vehicle is issued. In (a) of FIG. 16 and (b) of FIG. 16, the imaginary line L1 is displayed in the schematic diagram, but an example in which the imaginary line L1 is not displayed may be also employed. As a gesture operation for issuing the inter-vehicle distance change instruction command, an operation with one finger other than the pinch operation with two fingers may be used, and an operation for changing the distance between the host vehicle icon and the nearby vehicle icon may be used.

Figure 17:
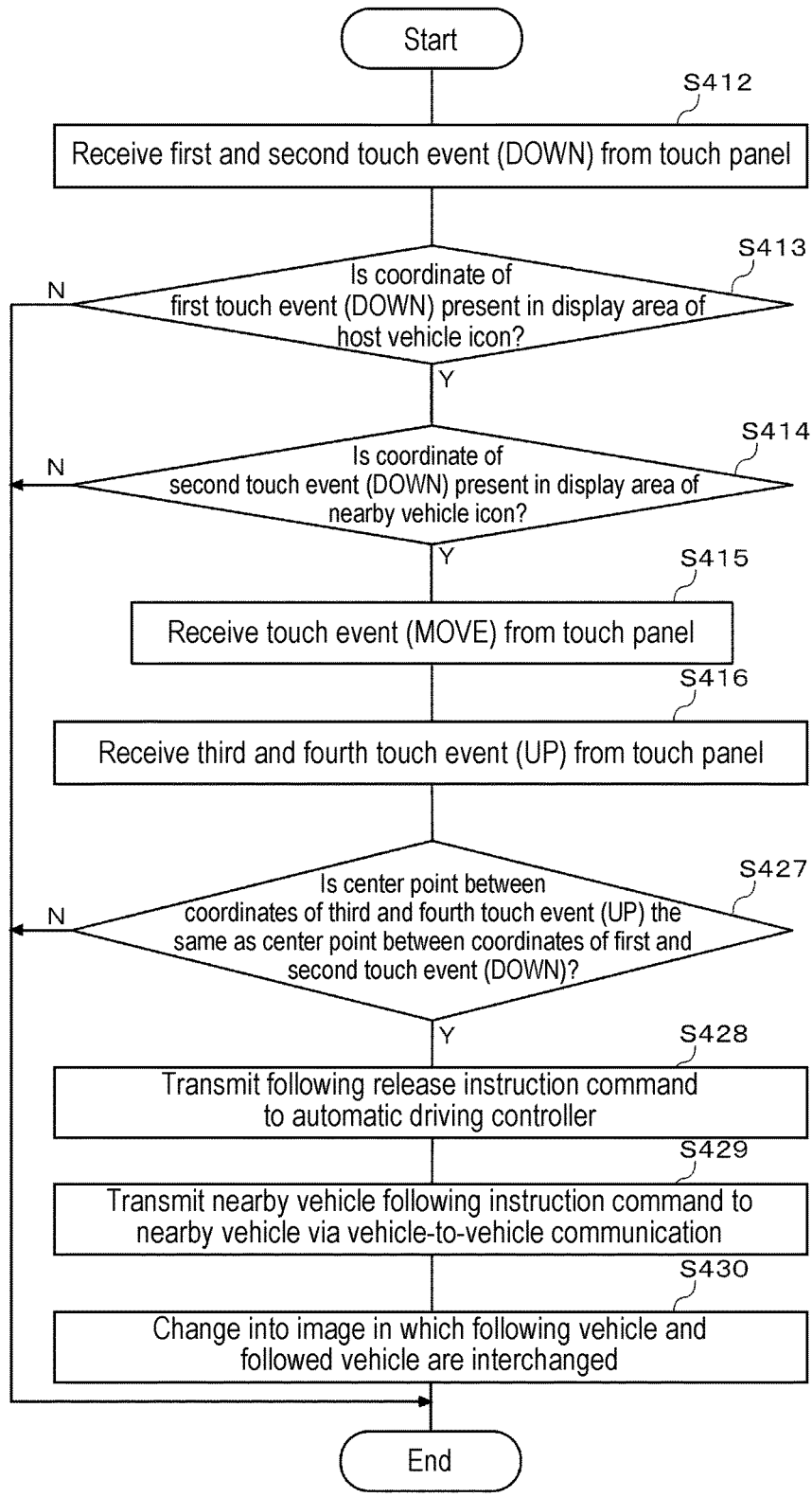
FIG. 17 is a flowchart illustrating a processing example of issuing a command for interchanging positions of two vehicles in following traveling by a gesture operation according to the embodiment of the present invention.

FIG. 17 is a flowchart illustrating a processing example of issuing a command for interchanging positions of two vehicles in following traveling by a gesture operation. In this processing example, it is assumed that a host vehicle is traveling following a nearby vehicle. Processes from step S412 to step S416 are the same as those of the flowchart of FIG. 13. Determination unit 11 determines whether or not the center point between a third coordinate and a fourth coordinate detected by the third and fourth touch event (UP) is the same as the center point between a first coordinate and a second coordinate detected by the first and second touch event (DOWN) (S427). In a case where the center point between the third coordinate and the fourth coordinate is the same as the center point between the first coordinate and the second coordinate (Y in S427), instruction unit 13 issues a following release instruction command for releasing following traveling in which the host vehicle is traveling following the nearby vehicle to automatic driving controller 20 (S428). At this time, instruction unit 13 transmits a nearby vehicle following instruction command for instructing the nearby vehicle to follow the host vehicle to the nearby vehicle via a vehicle-to-vehicle communication (S429). The nearby vehicle following instruction command may be transmitted to the nearby vehicle via a relay device. Image generation unit 12 interchanges the host vehicle (following vehicle) icon and the nearby vehicle (followed vehicle) icon in the schematic diagram (S430). In a case where positions of the two center points are different from each other in step S427 (N in S427), it is determined that the gesture operation is not a following traveling vehicle interchange instruction, and the process ends.

Figure 18:
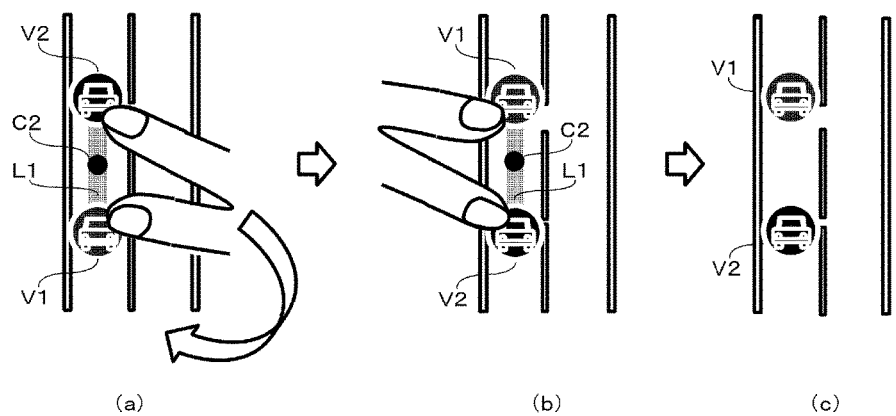
FIG. 18 is a diagram illustrating an example of a gesture operation according to the flowchart of FIG. 17.

FIG. 18 is a diagram illustrating an example of a gesture operation according to the flowchart of FIG. 17. In a case where a driver is about to interchange positions of the host vehicle and a nearby vehicle in following traveling, as illustrated in (a) of FIG. 18, a driver touches the host vehicle icon V1 and a nearby vehicle icon V2 with two fingers. In this state, as illustrated in (b) of FIG. 18, a driver rotates the two fingers so as to interchange the host vehicle icon V1 and the nearby vehicle icon V2. Accordingly, a command for interchanging the positions of the host vehicle and the nearby vehicle in following traveling is issued. In (c) of FIG. 18, a schematic diagram after vehicle interchange is illustrated, and the positions of the host vehicle icon V1 and the nearby vehicle icon V2 are reversed compared to the positions in (a) of FIG. 18. In (a) and (b) of FIG. 18, an imaginary line L1 and a center point C2 between the host vehicle icon V1 and the nearby vehicle icon V2 are displayed in the schematic diagram, but an example in which the imaginary line L1 and the center point C2 are not displayed may be also employed. The order of following traveling is periodically interchanged, and thus it is possible to equalize fuel consumption in the host vehicle and the nearby vehicle. As a gesture operation that issues a following relationship change instruction command, other than the above operation, an operation that interchanges the following relationship between the host vehicle icon and the nearby vehicle icon may be used. The host vehicle icon and the nearby vehicle icon may be interchanged by displaying an interchange button in the host vehicle icon or the nearby vehicle icon or between the host vehicle icon and the nearby vehicle icon, and pressing the interchange button. After a following relationship is set, automatic driving controller 20 may periodically perform interchange control.

Figure 19:
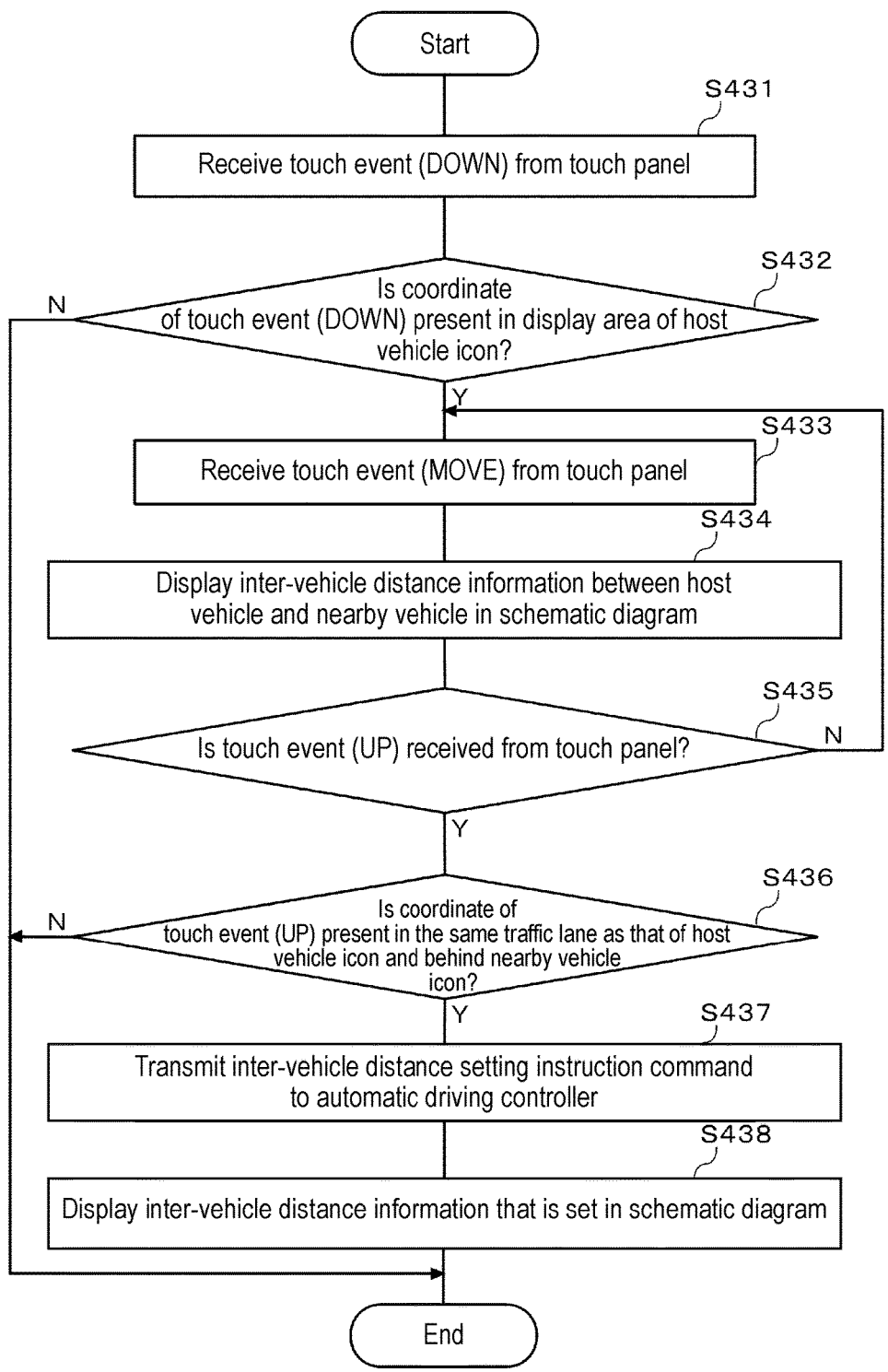
FIG. 19 is a flowchart illustrating a first processing example of issuing an inter-vehicle distance setting instruction command for setting an inter-vehicle distance between a host vehicle and a nearby vehicle by a gesture operation according to the embodiment of the present invention.

FIG. 19 is a flowchart illustrating a first processing example of issuing an inter-vehicle distance setting instruction command for setting an inter-vehicle distance between host vehicle and nearby vehicle by a gesture operation. This processing example can be also applied in a stage of instructing following traveling, and a stage of inter-vehicle distance change after following traveling is established. Determination unit 11 of HMI controller 10 receives a touch event (DOWN) from the touch panel (S431). Determination unit 11 determines whether or not a coordinate detected by the touch event (DOWN) is present in a display area of the host vehicle icon (S432). In a case where the coordinate detected by the touch event (DOWN) is present outside the display area of the host vehicle icon (N in S432), it is determined that the gesture operation is not an inter-vehicle distance setting instruction, and the process ends.

In a case where the coordinate detected by the touch event (DOWN) is present in the display area of the host vehicle icon (Y in S432), determination unit 11 receives a touch event (MOVE) from the touch panel (S433). Image generation unit 12 displays the inter-vehicle distance between the host vehicle and the nearby vehicle in the schematic diagram (S434). During a period for which a touch event (UP) is not received from the touch panel (N in S435), the process transitions to step S433, and reception of a touch event (MOVE) and display of the inter-vehicle distance information are continued (S433 and S434). That is, as the distance between the host vehicle icon and the nearby vehicle icon is changed, image generation unit 12 updates the inter-vehicle distance information in the schematic diagram in real time.

When a touch event (UP) is received from the touch panel (Y in S435), determination unit 11 determines whether or not a coordinate detected by the touch event (UP) is present in the same traffic lane as that of the host vehicle icon and behind the nearby vehicle icon (S436). In a case where the coordinate detected by the touch event (UP) is present in the same traffic lane as that of the host vehicle icon and behind the nearby vehicle icon (Y in S436), instruction unit 13 issues an inter-vehicle distance setting instruction command for setting an inter-vehicle distance according to the distance between the host vehicle icon and the nearby vehicle icon to automatic driving controller 20 (S437). Image generation unit 12 displays the inter-vehicle distance information that is set in the schematic diagram (S438). In a case where the coordinate detected by the touch event (UP) is not present in the same traffic lane as that of the host vehicle icon and behind the nearby vehicle icon (N in S436), it is determined that the gesture operation is not an inter-vehicle distance setting instruction, and the process ends.

Figure 20:
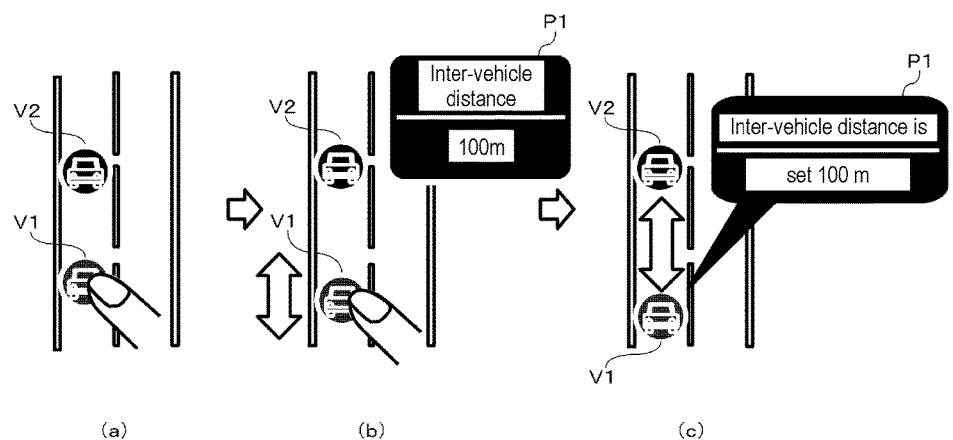
FIG. 20 is a diagram illustrating an example of a gesture operation according to the flowchart of FIG. 19.

FIG. 20 is a diagram illustrating an example of a gesture operation according to the flowchart of FIG. 19. In a case where a driver is about to set an inter-vehicle distance between host vehicle and nearby vehicle, as illustrated in (a) of FIG. 20, a driver drags a host vehicle icon V1, and as illustrated in (b) of FIG. 20, upwardly or downwardly moves the host vehicle icon V1. During dragging, a pop-up window P1 for displaying an inter-vehicle distance is displayed. As illustrated in (c) of FIG. 20, when the host vehicle icon V1 is dropped, an inter-vehicle distance setting instruction command is issued. A message indicating that an inter-vehicle distance is set is displayed in the pop-up window P1, and then the pop-up window P1 is deleted.

Figure 21:
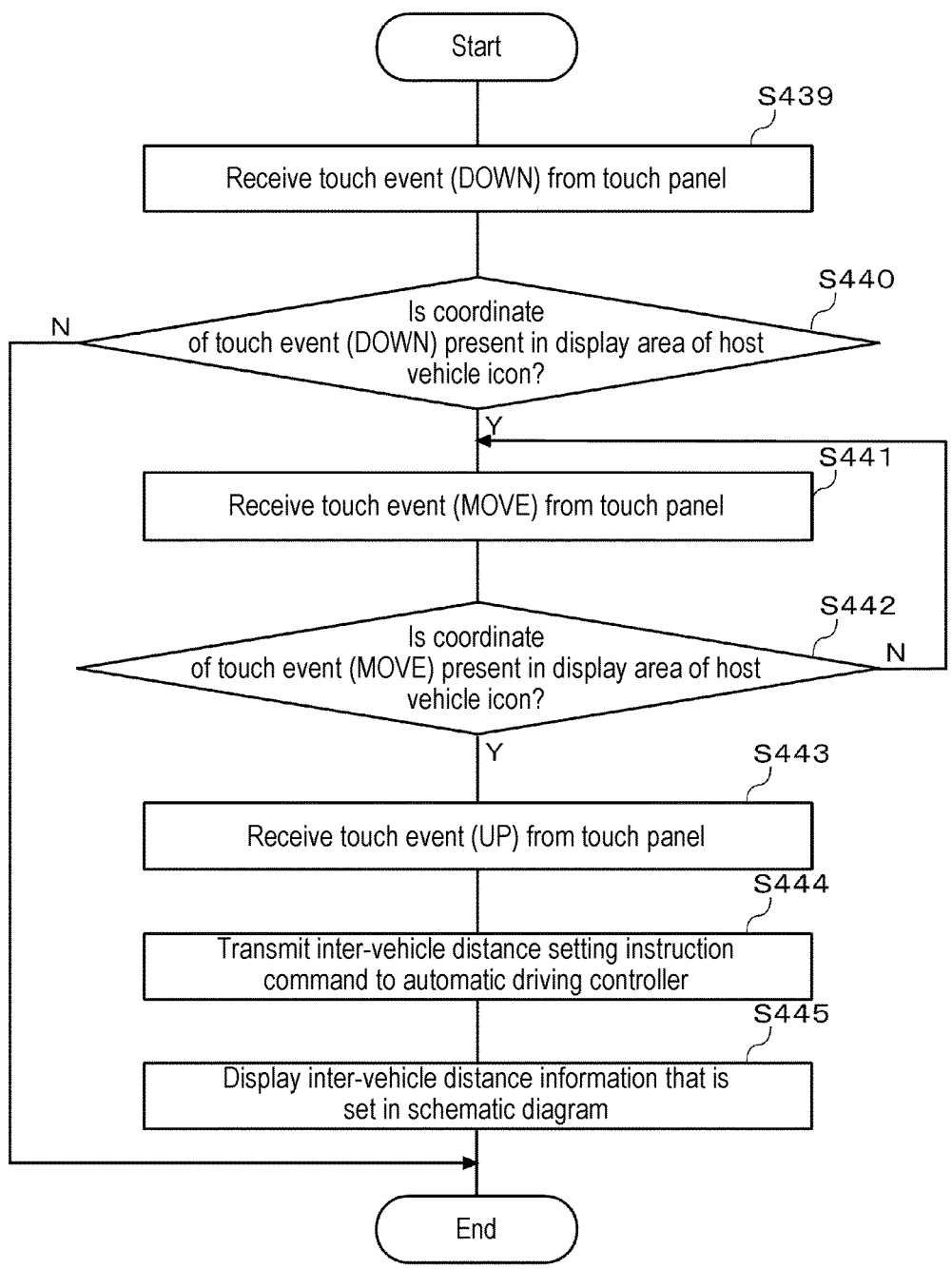
FIG. 21 is a flowchart illustrating a second processing example of issuing an inter-vehicle distance setting instruction command for setting an inter-vehicle distance between a host vehicle and a nearby vehicle by a gesture operation according to the embodiment of the present invention.

FIG. 21 is a flowchart illustrating a second processing example of issuing an inter-vehicle distance setting instruction command for setting an inter-vehicle distance between host vehicle and nearby vehicle by a gesture operation. This processing example can be applied in a stage of inter-vehicle distance change after following traveling is established. Determination unit 11 of HMI controller 10 receives a touch event (DOWN) from the touch panel (S439). Determination unit 11 determines whether or not a coordinate detected by the touch event (DOWN) is present in a display area of a host vehicle icon (S440). In a case where the coordinate detected by the touch event (DOWN) is present outside the display area of a host vehicle icon (N in S440), it is determined that the gesture operation is not an inter-vehicle distance setting instruction, and the process ends.

In a case where the coordinate detected by the touch event (DOWN) is present in the display area of a host vehicle icon (Y in S440), determination unit 11 receives a touch event (MOVE) from the touch panel (S441). Determination unit 11 determines whether or not a coordinate detected by the touch event (MOVE) is present in a display area of the host vehicle icon (S442). In a case where the coordinate detected by the touch event (MOVE) is present outside the display area of the host vehicle icon (N in S442), the process transitions to S441, and reception of the touch event (MOVE) is continued.

In a case where the coordinate detected by the touch event (MOVE) is present in the display area of the host vehicle icon (Y in S442), determination unit 11 receives a touch event (UP) from the touch panel (S443). In other words, a flick input starting from the host vehicle icon is detected. Instruction unit 13 issues an inter-vehicle distance setting instruction command for setting a current inter-vehicle distance between the host vehicle and the nearby vehicle to be a constant value, shorten, or lengthen, to automatic driving controller 20 (S444). Image generation unit 12 displays the inter-vehicle distance information that is set in the schematic diagram (S445).

Figure 22:
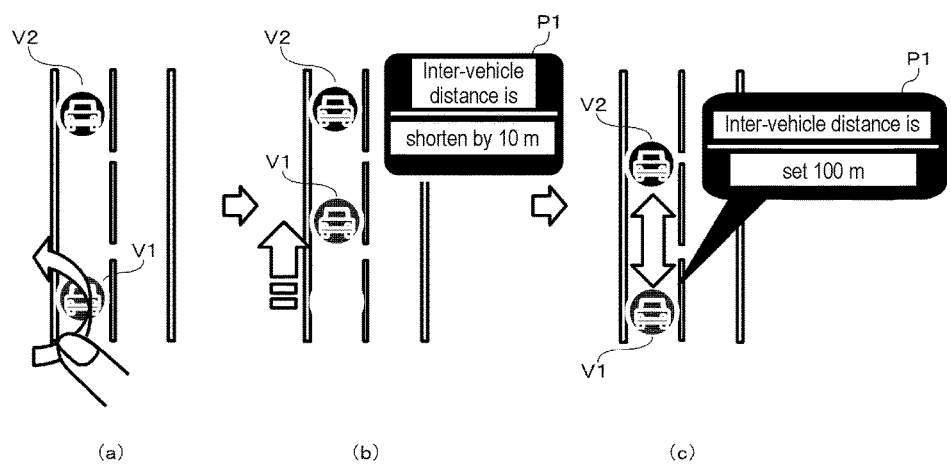
FIG. 22 is a diagram illustrating an example of a gesture operation according to the flowchart of FIG. 21.

FIG. 22 is a diagram illustrating an example of a gesture operation according to the flowchart of FIG. 21. In a case where a driver is about to set an inter-vehicle distance between host vehicle and nearby vehicle, as illustrated in (a) of FIG. 22, a driver flicks a host vehicle icon V1 as a starting point. When the host vehicle icon V1 is flicked, as illustrated in (b) of FIG. 22, a pop-up window P1 in which a distance excluded from the current inter-vehicle distance or a distance added to the current inter-vehicle distance is included is displayed, and an inter-vehicle distance setting instruction command is issued. Then, as illustrated in (c) of FIG. 22, a message indicating that the changed inter-vehicle distance is set is displayed in the pop-up window P1, and then the pop-up window P1 is deleted after a predetermined time has elapsed. In (a) and (b) of FIG. 22, the inter-vehicle distance is shorten by 10 m by flicking the host vehicle icon V1 to the left side. When the host vehicle icon V1 is flicked to the right side, the inter-vehicle distance is lengthen by 10 m.

Figure 23:
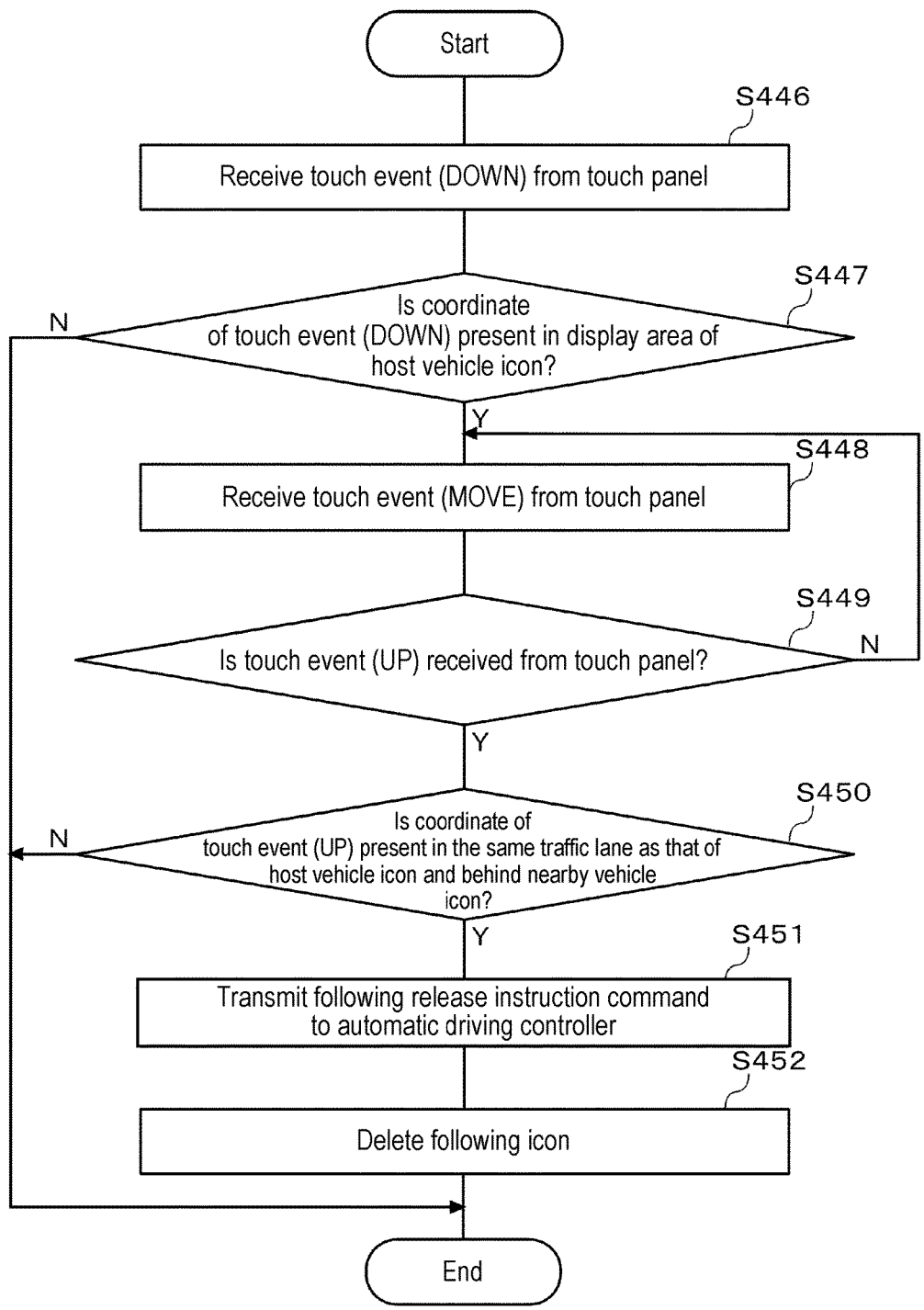
FIG. 23 is a flowchart illustrating a first processing example of issuing a following release command for releasing following traveling by a gesture operation according to the embodiment of the present invention.

FIG. 23 is a flowchart illustrating a first processing example of issuing a following release command for releasing following traveling by a gesture operation. Determination unit 11 of HMI controller 10 receives a touch event (DOWN) from the touch panel (S446). Determination unit 11 determines whether or not a coordinate detected by the touch event (DOWN) is present in a display area of the host vehicle icon (S447). In a case where the coordinate detected by the touch event (DOWN) is present outside the display area of the host vehicle icon (N in S447), it is determined that the gesture operation is not a following release instruction, and the process ends.

In a case where the coordinate detected by the touch event (DOWN) is present in the display area of the host vehicle icon (Y in S447), determination unit 11 receives a touch event (MOVE) from the touch panel (S448). During a period for which the touch event (UP) is not received from the touch panel (N in S449), the process transitions to step S448, and reception of a touch event (MOVE) is continued. When a touch event (UP) is received from the touch panel (Y in S449), determination unit 11 determines whether or not a coordinate detected by the touch event (UP) is present in the same traffic lane as that of the host vehicle icon and behind the nearby vehicle icon (S450). In a case where the coordinate detected by the touch event (UP) is present in the same traffic lane as that of the host vehicle icon and behind the nearby vehicle icon (Y in S450), instruction unit 13 issues a following release instruction command to automatic driving controller 20 (S451). Image generation unit 12 deletes the following icon in the schematic diagram (S452). In a case where the coordinate detected by the touch event (UP) is not present in the same traffic lane as that of the host vehicle icon and behind the nearby vehicle icon (N in S450), it is determined that the gesture operation is not a following release instruction, and the process ends.

Figure 24:
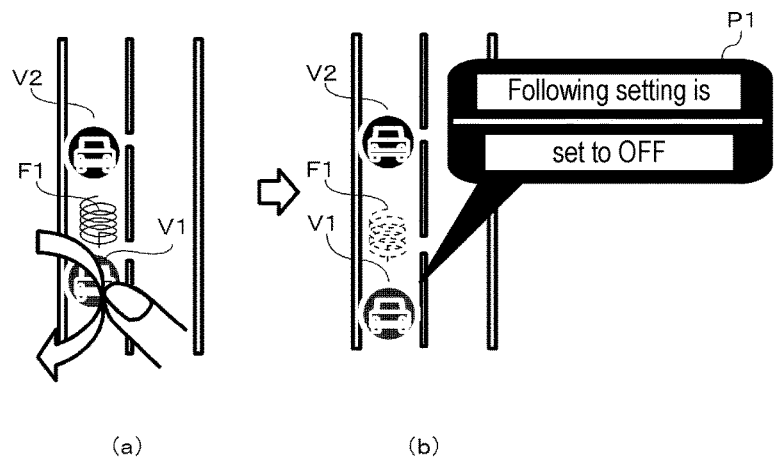
FIG. 24 is a diagram illustrating an example of a gesture operation according to the flowchart of FIG. 23.

FIG. 24 is a diagram illustrating an example of a gesture operation according to the flowchart of FIG. 23. In a case where a driver is about to release the following traveling, as illustrated in (a) of FIG. 24, a driver flicks a host vehicle icon V1 as a starting point in a direction away from a nearby vehicle icon V2 on the same traffic lane. When the host vehicle icon V1 is flicked in the direction, a following release instruction command is issued. Then, as illustrated in (b) of FIG. 24, a pop-up window P1 including a message indicating that following traveling is released is displayed, and then the pop-up window P1 is deleted after a predetermined time has elapsed. The following icon F1 is also deleted. Instead of flicking the host vehicle icon V1 in a direction away from the nearby vehicle icon V2, a form in which a following release instruction command is issued by flicking the nearby vehicle icon V2 in a direction away from the host vehicle icon V1 may be employed.

Figure 25:
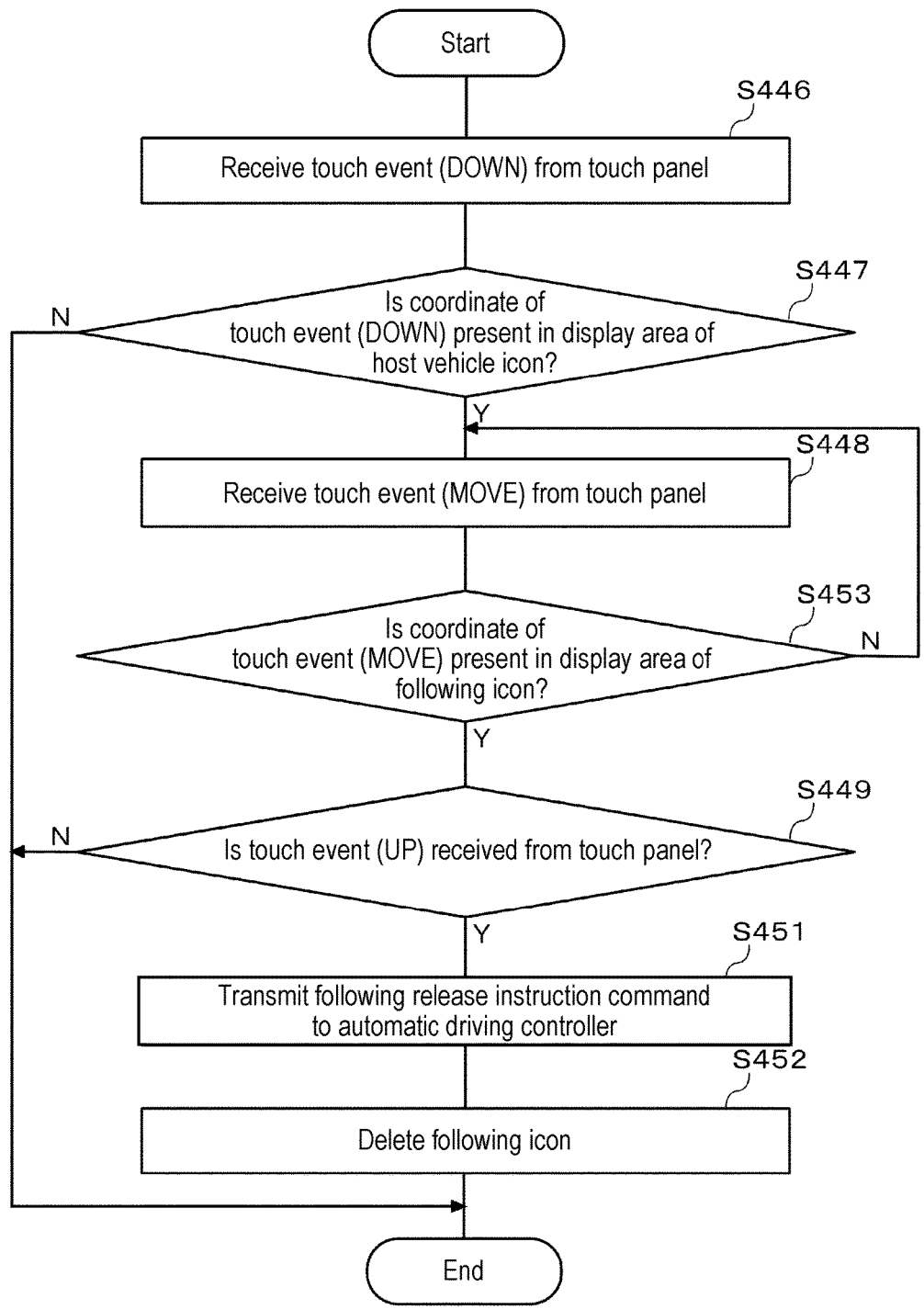
FIG. 25 is a flowchart illustrating a second processing example of issuing a following release command for releasing following traveling by a gesture operation according to the embodiment of the present invention.

FIG. 25 is a flowchart illustrating a second processing example of issuing a following release command for releasing following traveling by a gesture operation. Processes from step S446 to step S448 are the same as those of the flowchart of FIG. 23. When a touch event (UP) is received from the touch panel (S448), determination unit 11 determines whether or not a coordinate detected by the touch event (UP) is present in the display area of the following icon (S453). In a case where the coordinate detected by the touch event (UP) is present outside the display area of the following icon (N in S453), the process transitions to S448, and reception of the touch event (MOVE) is continued. In a case where the coordinate detected by the touch event (UP) is present in the display area of the following icon (Y in S453), determination unit 11 determines whether or not a touch event (UP) is received from the touch panel (S449). In a case where the touch event (UP) is not received (N in S449), it is determined that the gesture operation is not a following release instruction, and the process ends. In a case where the touch event (UP) is received (Y in S449), instruction unit 13 issues a following release instruction command to automatic driving controller 20 (S451). Image generation unit 12 deletes the following icon in the schematic diagram (S452).

Figure 26:
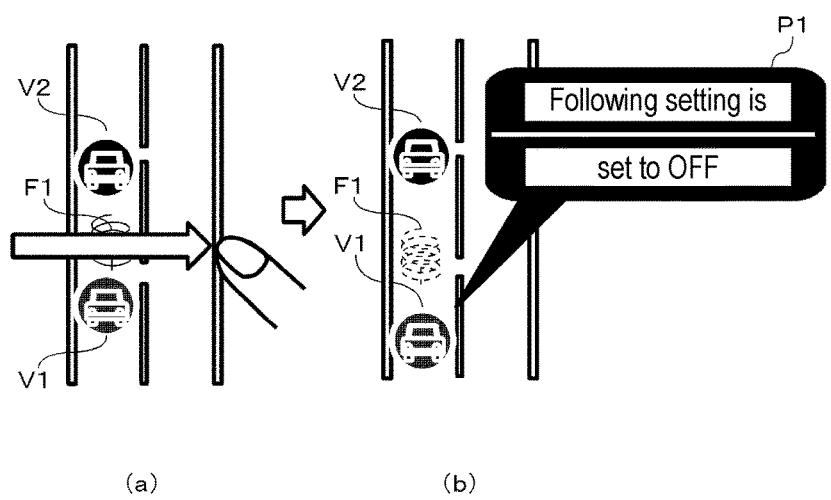
FIG. 26 is a diagram illustrating an example of a gesture operation according to the flowchart of FIG. 25.

FIG. 26 is a diagram illustrating an example of a gesture operation according to the flowchart of FIG. 25. In a case where a driver is about to release following traveling, as illustrated in (a) of FIG. 26, a driver swipes the following icon F1 so as to traverse the following icon. Accordingly, a following release instruction command is issued. Then, as illustrated in (b) of FIG. 26, a pop-up window P1 including a message indicating that following traveling is released is displayed, and then the pop-up window P1 is deleted after a predetermined time has elapsed. The following icon F1 is also deleted. In order to issue a following release instruction command, other than the above operation, an operation that cancels the link between the host vehicle icon and the nearby vehicle icon may be used.

Figure 27:
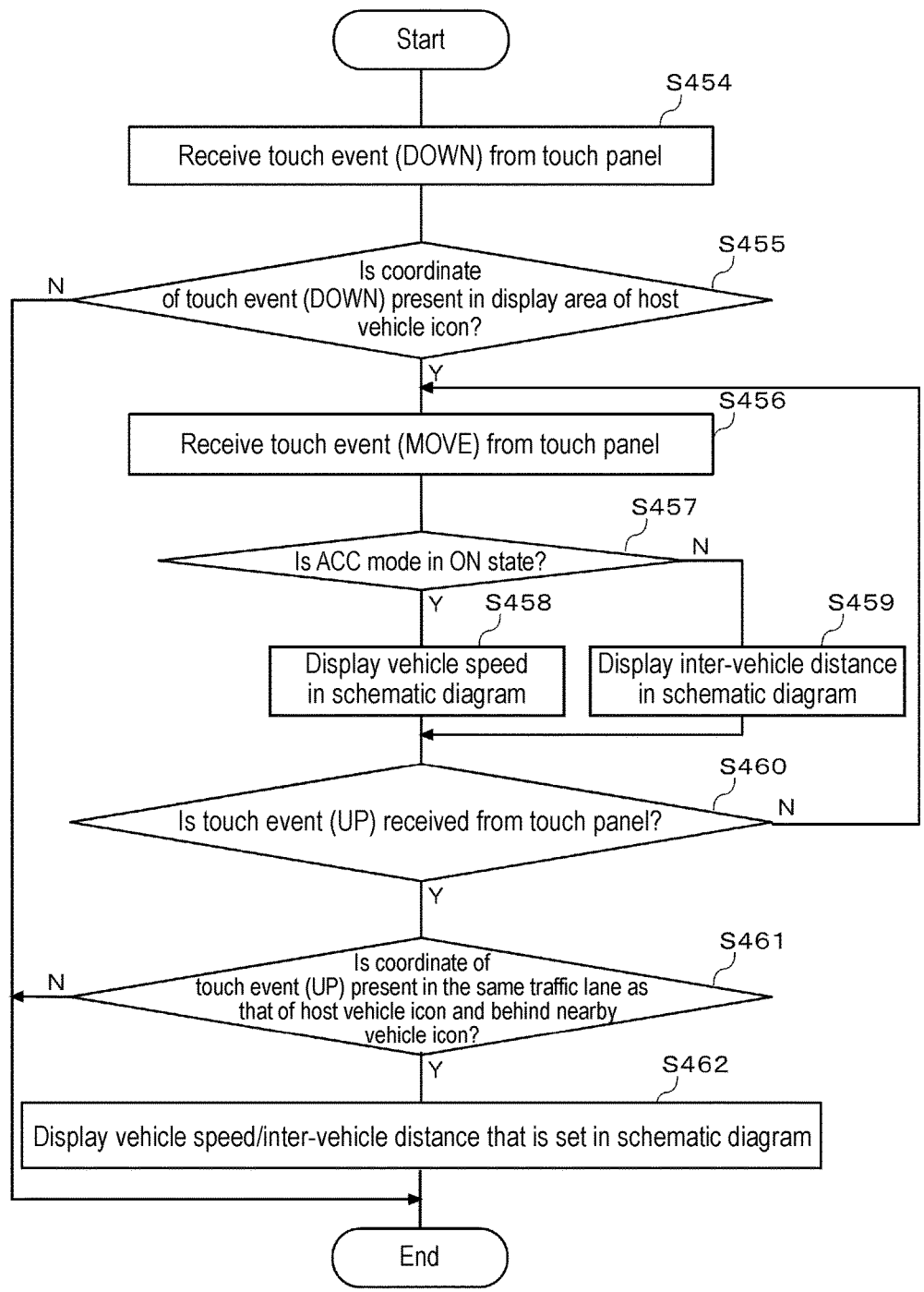
FIG. 27 is a flowchart illustrating a display example of a schematic diagram in a vehicle that can choose an adaptive cruise control (ACC) mode and a following mode according to the embodiment of the present invention.

FIG. 27 is a flowchart illustrating a display example of a schematic diagram in a vehicle that can choose an adaptive cruise control (ACC) mode and a following mode. In the present embodiment, the ACC mode is a mode whose main purpose is constant speed traveling at a set speed, and the following mode is a mode whose main purpose is traveling while maintaining an inter-vehicle distance that is set between the host vehicle and the preceding vehicle.

Determination unit 11 of HMI controller 10 receives a touch event (DOWN) from the touch panel (S454). Determination unit 11 determines whether or not a coordinate detected by the touch event (DOWN) is present in a display area of a host vehicle icon (S455). In a case where the coordinate detected by the touch event (DOWN) is present outside the display area of a host vehicle icon (N in S455), the process ends without display processing.

In a case where the coordinate detected by the touch event (DOWN) is present in the display area of a host vehicle icon (Y in S455), determination unit 11 receives a touch event (MOVE) from the touch panel (S456). Determination unit 11 determines whether or not the ACC mode is in an ON state (S457). In a case where the ACC mode is in an ON state (Y in S457), image generation unit 12 displays a current vehicle speed of the host vehicle in the schematic diagram (S458). In a case where the ACC mode is not in an ON state (N in S457), image generation unit 12 displays an inter-vehicle distance between the host vehicle and the nearby vehicle in the schematic diagram (S459). During a period for which the touch event (UP) is not received from the touch panel (N in S460), the process transitions to step S456, and processes from step S457 to step S459 are continued.

When the touch event (UP) is received from the touch panel (Y in S460), determination unit 11 determines whether or not a coordinate detected by the touch event (UP) is present in the same traffic lane as that of the host vehicle icon and behind the nearby vehicle icon (S461). In a case where the coordinate detected by the touch event (UP) is present in the same traffic lane as that of the host vehicle icon and behind the nearby vehicle icon (Y in S461), Image generation unit 12 displays the vehicle speed information or the inter-vehicle distance information that is set in the schematic diagram (S462). In a case where the coordinate detected by the touch event (UP) is not present in the same traffic lane as that of the host vehicle icon and behind the nearby vehicle icon (N in S461), the process ends without displaying the vehicle speed information or the inter-vehicle distance information that is set.

Figure 28A:
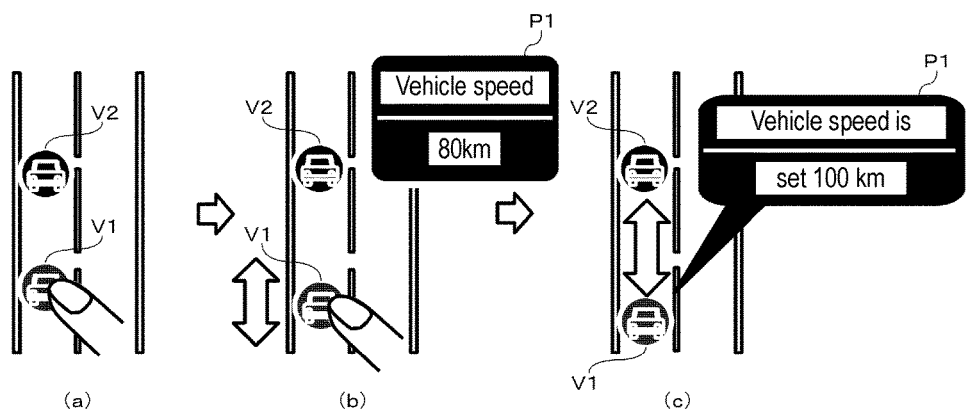
FIG. 28A is a diagram illustrating an example of a gesture operation according to the flowchart of FIG. 27.

FIG. 28A is a diagram illustrating an example of a gesture operation according to the flowchart of FIG. 27. In FIG. 28A, an example in a case where the host vehicle is set to the ACC mode is illustrated. In a case where a driver is about to set the vehicle speed, as illustrated in (a) of FIG. 28A, a driver drags a host vehicle icon V1, and as illustrated in (b) of FIG. 28A, upwardly or downwardly moves the host vehicle icon V1. For example, moving upwardly means speed-up, and moving downwardly means speed-down. During dragging, a pop-up window P1 for displaying the vehicle speed is displayed. As illustrated in (c) of FIG. 28A, when the host vehicle icon V1 is dropped, a vehicle speed setting instruction command is issued. A message indicating that the vehicle speed is set is displayed in the pop-up window P1, and then the pop-up window P1 is deleted.

Figure 28B:
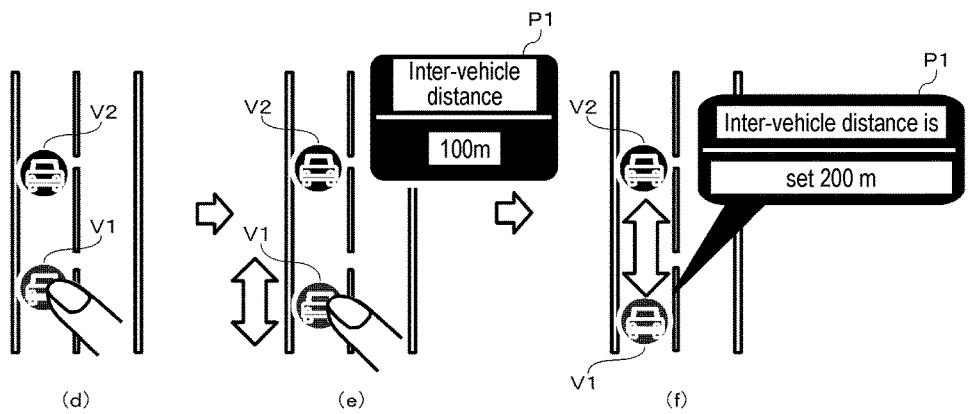
FIG. 28B is a diagram illustrating an example of a gesture operation according to the flowchart of FIG. 27.

In FIG. 28B, an example in a case where the host vehicle is set to the following mode is illustrated. In a case where a driver is about to set the inter-vehicle distance between the host vehicle and the nearby vehicle, as illustrated in (d) of FIG. 28B, a driver drags a host vehicle icon V1, and as illustrated in (e) of FIG. 28B, upwardly or downwardly moves the host vehicle icon V1. For example, moving upwardly means that the inter-vehicle distance is shorten, and moving downwardly means that the inter-vehicle distance is lengthen. During dragging, a pop-up window P1 for displaying the inter-vehicle distance is displayed. As illustrated in (f) of FIG. 28B, when the host vehicle icon V1 is dropped, an inter-vehicle distance setting instruction command is issued. A message indicating that an inter-vehicle distance is set is displayed in the pop-up window P1, and then the pop-up window P1 is deleted.

FIG. 29 is a flowchart illustrating a fourth processing example of issuing a following instruction command by a gesture operation. The fourth processing example is an example of dragging a host vehicle icon and then changing a scale of the schematic diagram. Determination unit 11 of HMI controller 10 receives a touch event (DOWN) from the touch panel (S463). Determination unit 11 determines whether or not a coordinate detected by the touch event (DOWN) is present in a display area of a host vehicle icon (S464). In a case where the coordinate detected by the touch event (DOWN) is present outside the display area of a host vehicle icon (N in S464), it is determined that the gesture operation is not a following instruction, and the process ends.

In a case where the coordinate detected by the touch event (DOWN) is present in the display area of a host vehicle icon (Y in S464), determination unit 11 receives a touch event (MOVE) from the touch panel (S465). Determination unit 11 determines whether or not a nearby vehicle (preceding vehicle) icon is included in the schematic diagram of the screen displayed on the touch panel (S466). In a case where a nearby vehicle (preceding vehicle) icon is not included in the schematic diagram of the screen (N in S466), image generation unit 12 changes (reduces) a scale of the schematic diagram such that a nearby vehicle (preceding vehicle) icon is included in the schematic diagram (S467). In a case where a nearby vehicle (preceding vehicle) icon is included in the schematic diagram of the screen (Y in S466), the process of step S467 is skipped. During a period for which the touch event (UP) is not received from the touch panel (N in S468), the process transitions to step S465, and processes from step S465 to step S467 are continued. When the touch event (UP) is received from the touch panel (Y in S468), instruction unit 13 issues a scale change instruction command to automatic driving controller 20 (S469). Image generation unit 12 displays the schematic diagram on the set scale (S470).

Figure 30:
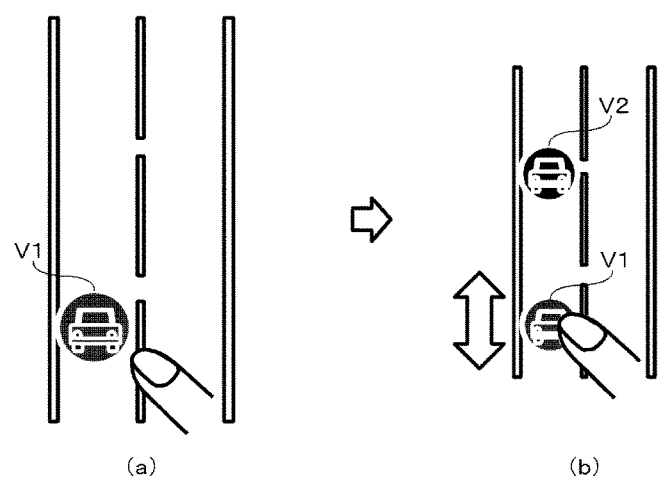
FIG. 30 is a diagram illustrating an example of a gesture operation according to the flowchart of FIG. 29.

FIG. 30 is a diagram illustrating an example of a gesture operation according to the flowchart of FIG. 29. As illustrated in (a) of FIG. 30, when a driver drags a host vehicle icon V1, in a case where a nearby vehicle icon is not present in the schematic diagram displayed on the screen, as illustrated in (b) of FIG. 30, a driver decreases the scale of the schematic diagram until the nearby vehicle icon V2 is included in the schematic diagram. When the host vehicle icon V1 is dropped onto the nearby vehicle icon V2, a following instruction command is issued. Accordingly, it is possible to easily find a nearby vehicle and more quickly issue a following instruction command, and this leads to a saving in fuel consumption.

Figure 31:
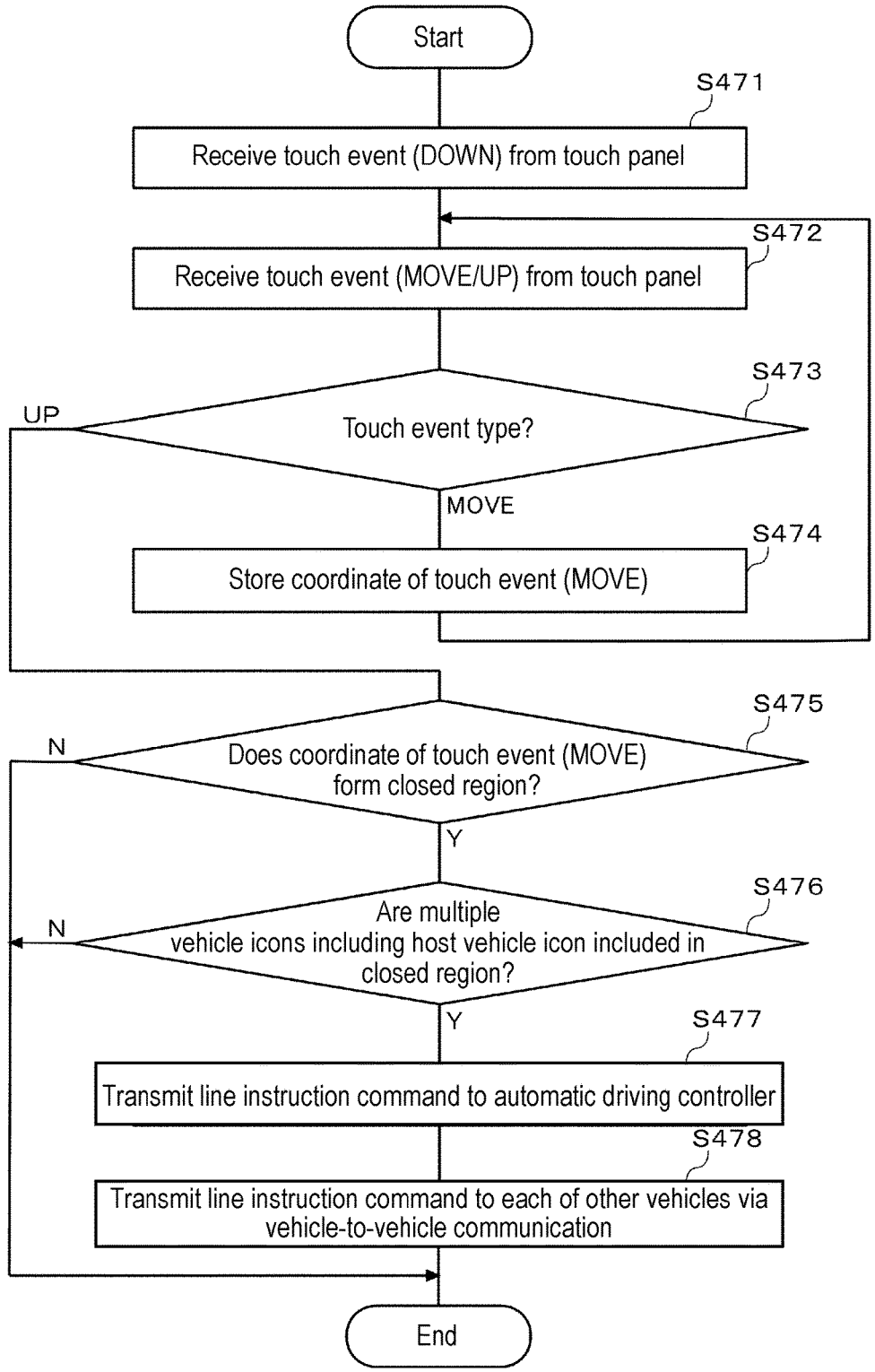
FIG. 31 is a flowchart illustrating a processing example of issuing a line instruction command for instructing line traveling by a gesture operation according to the embodiment of the present invention.

FIG. 31 is a flowchart illustrating a processing example of issuing a line instruction command for instructing line traveling by a gesture operation. In the present embodiment, line traveling means a traveling form in which three or more vehicles travel side by side in a line while keeping the same inter-vehicle distance from each other. Relationship between two vehicles adjacent to each other is the same as the following traveling.

Determination unit 11 of HMI controller 10 receives a touch event (DOWN) from the touch panel (S471). Then, determination unit 11 receives a touch event (MOVE/UP) from the touch panel (S472). Determination unit 11 determines the type of the touch event (S473). In a case where the type of the touch event is "MOVE" (MOVE in S473), determination unit 11 stores a coordinates of the touch event (MOVE) in a work area (S474). Then, the process transitions to step S472, and reception of a touch event (MOVE/UP) is continued.

In a case where the type of the touch event is "UP" (S473UP), determination unit 11 determines whether or not the coordinate of the touch event (MOVE) forms a closed region by referring to the work area (S474). In a case where the coordinate of the touch event (MOVE) forms a closed region (Y in S474), determination unit 11 determines whether or not multiple vehicle icons including a host vehicle icon are included in the closed region (S475). In a case where the multiple vehicle icons are included in the closed region (Y in S475), instruction unit 13 issues a line instruction command to automatic driving controller 20 (S476), while instruction unit 13 transmits the line instruction command to each of multiple nearby vehicles corresponding to multiple nearby vehicle icons in the closed region via a vehicle-to-vehicle communication (via a relay device) (S478). In a case where one nearby vehicle icon is included in the closed region, instead of the line instruction command, a following instruction command is issued and transmitted. In a case where the coordinate of the touch event (MOVE) does not form a closed region in step S474 (N in S474), and in a case where multiple vehicle icons are not included in the closed region in step S475 (N of S475), it is determined that the gesture operation is not a line instruction, and the process ends.

Figure 32A:
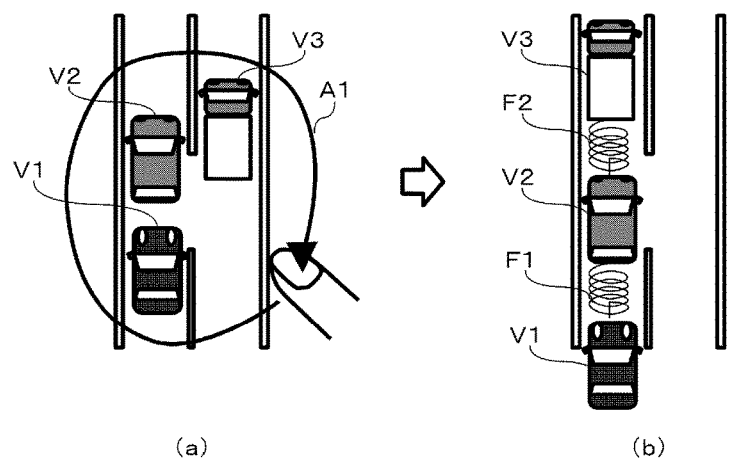
FIG. 32A is a diagram illustrating an example of a gesture operation according to the flowchart of FIG. 31.

FIG. 32A is a diagram illustrating an example of a gesture operation according to the flowchart of FIG. 31. In a case where a driver tries three vehicles including the host vehicle and two nearby vehicles to travel in a line, as illustrated in (a) of FIG. 32A, a driver moves an instruction point so as to surround a host vehicle icon V1 and two nearby vehicle icons V2 and V3, and returns the instruction point to the starting point of the instruction point, thereby forming a closed region A1. When the closed region A1 is formed, a line instruction command is issued, and as illustrated in (b) of FIG. 32A, line traveling is established with three vehicles including the host vehicle and the two other vehicles. Following icons F1 and F2 are displayed at a position between vehicle icons V1, V2, and V3 that are adjacent to each other.

Figure 32B:
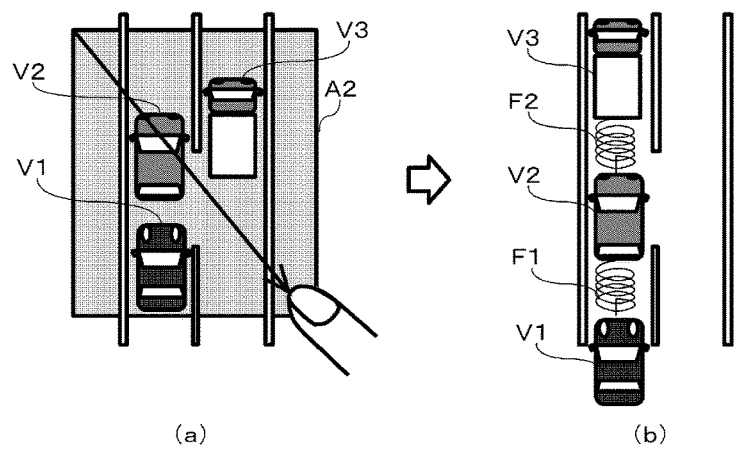
FIG. 32B is a diagram illustrating another example of a gesture operation according to the flowchart of FIG. 31.

Next, FIG. 32B is a diagram illustrating another example of a gesture operation according to the flowchart of FIG. 31. In a case where a driver tries three vehicles including a host vehicle and two other vehicles to travel in a line, as illustrated in (c) of FIG. 32B, a driver selects a host vehicle icon V1 and two nearby vehicle icons V2 and V3 using a rectangular-shaped range designation window A2. When a range designation operation is completed, a line instruction command is issued, and as illustrated in (d) of FIG. 32B, line traveling is established with three vehicles including the host vehicle and the two other vehicles. Following icons F1 and F2 are displayed at a position between vehicle icons V1, V2, and V3 that are adjacent to each other.

FIG. 33 is a flowchart illustrating a fifth processing example of issuing a following instruction command by a gesture operation. The fifth processing example is an example of requesting a confirm operation. Processes from step S40 to step S44 are the same as those of the flowchart of FIG. 6.

In a case where the coordinate detected by the touch event (UP) is present in the display area of the nearby vehicle icon (Y in S44), when determination unit 11 receives a confirm gesture input (Y in S485), instruction unit 13 issues a following instruction command for instructing the host vehicle to travel following the nearby vehicle corresponding to the nearby vehicle icon, to automatic driving controller 20 (S45). Image generation unit 12 displays a following icon indicating that the host vehicle is traveling following the nearby vehicle, at a position between the host vehicle icon and the nearby vehicle icon in the schematic diagram (S46). During a period for which there is no confirm gesture input (N in S485), the issue of the command is suspended.

Figure 34:
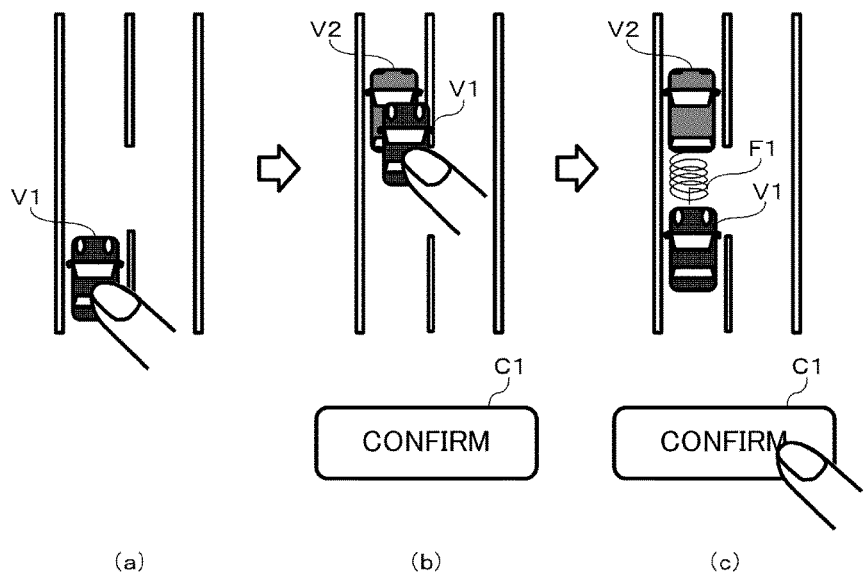
FIG. 34 is a diagram illustrating an example of a gesture operation according to the flowchart of FIG. 33.

FIG. 34 is a diagram illustrating an example of a gesture operation according to the flowchart of FIG. 33. When a driver is about to travel following a nearby vehicle, as illustrated in (a) of FIG. 34, a driver drags the host vehicle icon V1, and as illustrated in (b) of FIG. 34, moves the host vehicle icon V1 onto a nearby vehicle icon V2. When the host vehicle icon V1 is moved, a confirm button C1 is displayed. As illustrated in (c) of FIG. 34, when the confirm button C1 is pressed, a following instruction command is issued, and when following traveling is established, a following icon F1 is displayed at a position between the host vehicle icon V1 and the nearby icon V2.

Figure 35:
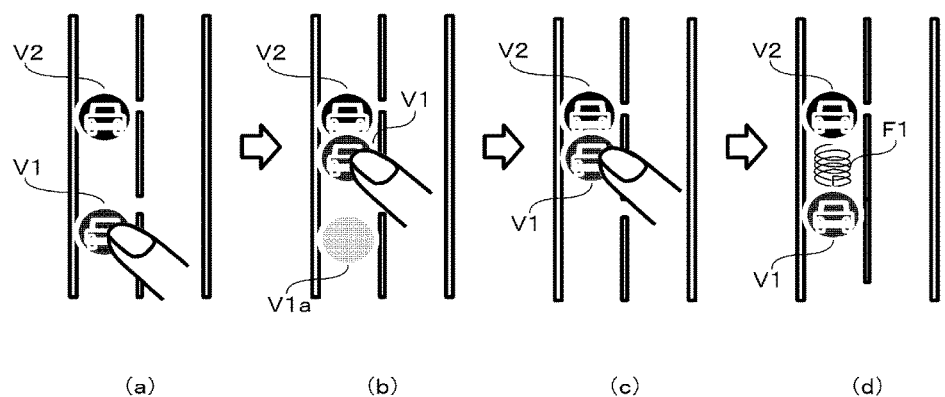
FIG. 35 is a diagram illustrating a display example according to the embodiment of the present invention during a period for which a host vehicle icon is dragged and dropped onto a nearby vehicle icon.

FIG. 35 is a diagram illustrating a display example during a period for which a host vehicle icon V1 is dragged and dropped onto a nearby vehicle icon V2. In a case where a driver is about to travel following a nearby vehicle, as illustrated in (a) of FIG. 35, a driver drags the host vehicle icon V1. During a period for which the host vehicle icon V1 is dragged and dropped onto the nearby vehicle icon V2, as illustrated in (b) of FIG. 35, an afterimage Via (a circle mark with a dotted line, or the like) is displayed at the original position of the host vehicle icon. As illustrated in (c) of FIG. 35, when the host vehicle icon V1 is dropped onto the nearby vehicle icon V2, the afterimage Via is deleted. As illustrated in (d) of FIG. 35, when following traveling is established, a following icon F1 is displayed at a position between the host vehicle icon V1 and the nearby vehicle icon V2.

Figure 36:
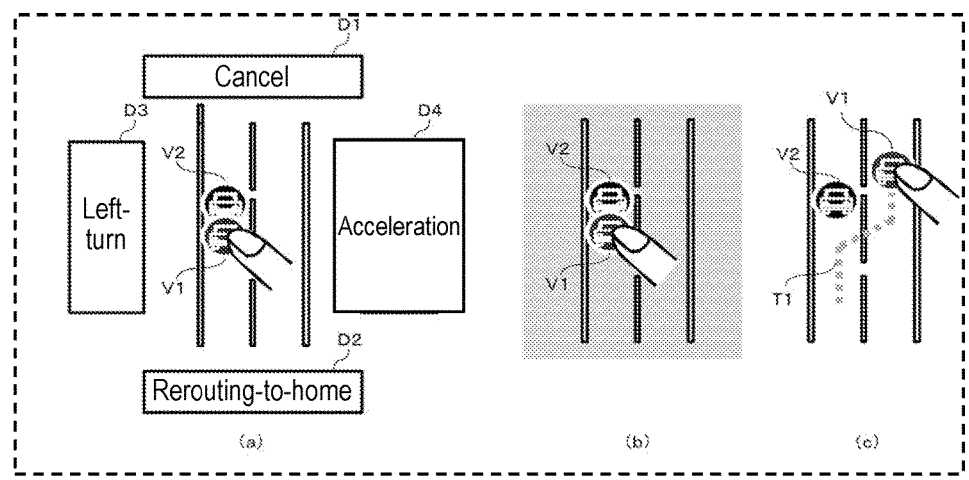
FIG. 36 is a diagram illustrating another display example according to the embodiment of the present invention during a period for which a host vehicle icon is dragged and dropped onto a nearby vehicle icon.

FIG. 36 is a diagram illustrating another display example during a period for which a host vehicle icon V1 is dragged and dropped onto a nearby vehicle icon V2. In (a) of FIG. 36, an example in which drop areas are displayed in the vicinity of a road area during a period for which the host vehicle icon V1 is dragged and dropped onto the nearby vehicle icon V2 is illustrated. In (a) of FIG. 36, a cancel drop area D1, a rerouting-to-home drop area D2, a left-turn drop area D3, and a right-turn drop area D4 are respectively displayed at up, down, right and left side of the road area. A driver drops the host vehicle icon V1 onto any one of the drop areas D1 to D4, and thus the corresponding operation can be performed. In the drop area, an operation other than the above operation may be displayed, and for example, an operation instruction such as rerouting to a gas station, rerouting to a parking area, rerouting to a service area, passing, traffic lane change, ACC, acceleration and deceleration to a target speed, or the like may be displayed. All roads may be a cancel drop area.

In (b) of FIG. 36, an example in which, during a period for which the host vehicle icon V1 is dragged and dropped onto the nearby vehicle icon V2, a color of a background such as a road or the like is changed (inverted, thinned, or the like) and the color of a background is returned to the original color thereof after the dropping is completed is illustrated. In (c) of FIG. 36, an example in which, during a period for which the host vehicle icon V1 is dragged and dropped onto the nearby vehicle icon V2, a movement trajectory T1 being dragged from a drag start position is displayed (a dotted line, or the like) and the trajectory T1 is deleted after the dropping is completed is illustrated.

Figure 37:
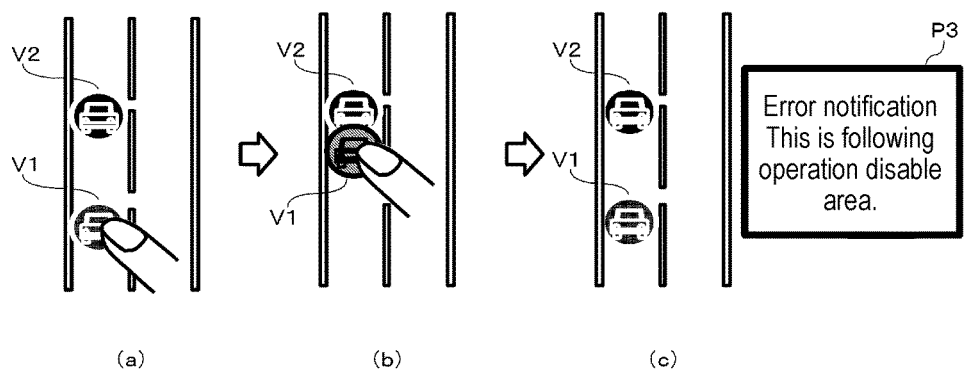

FIG. 37 is a diagram illustrating a display example of a host vehicle icon V1 being dragged in a case where there is a drop disable area or the like. In a case where a driver is about to travel following the nearby vehicle, as illustrated in (a) of FIG. 37, a driver drags the host vehicle icon V1. After the host vehicle icon V1 is dragged, when there is a drop disable area (a vehicle that is refused to be followed, an opposite traffic lane, or the like) or when a following operation is disabled depending on a situation, the color of the host vehicle icon V1 is changed (inverted, thinned, or the like). In a case where dropping onto a nearby vehicle icon V2 is disabled, as illustrated in (b) of FIG. 37, when the host vehicle icon V1 is dropped onto the nearby vehicle icon V2, as illustrated in (c) of FIG. 37, the host vehicle icon V1 is returned to the original position thereof, and a pop-up window P3 including an error message such as "This is a following operation disable area." is displayed.

FIG. 38A to FIG. 38C are diagrams illustrating another display example of a host vehicle icon V1 being dragged in a case where there is a drop disable area or the like. In FIG. 38A, an example in which, after the host vehicle icon V1 is dragged, when a following operation is disabled, a color of a background such as a road or the like is changed is illustrated. When a following operation is possible, the color of a background is returned to the original color thereof. In FIG. 38B, an example in which, after the host vehicle icon V1 is dragged, a color of a drop disable area is changed (inverted, thinned, or the like) is illustrated. In FIG. 38C, an example in which, after the host vehicle icon V1 is dragged, when there is a drop disable area or when a following operation is disabled, a notification using an error sound or a vibration is performed is illustrated.

FIG. 39 is a diagram illustrating a display example in a case where a drag operation is disabled. In a case where a driver is about to travel following the nearby vehicle, as illustrated in (a) of FIG. 39, at the starting of dragging of the host vehicle icon V1, when a start of an operation is disabled, as illustrated in (b) of FIG. 39, a color of the host vehicle icon V1 is changed, and a drag operation (a movement of an icon) is disabled. In addition, a pop-up window P3 including an error message such as "This is a following operation disable area." is displayed.

Figure 40A:
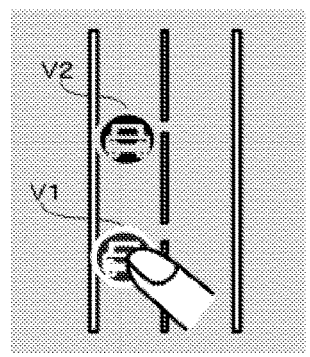
FIG. 40A is a diagram illustrating another display example according to the embodiment of the present invention in a case where a drag operation is disabled.
Figure 40B:
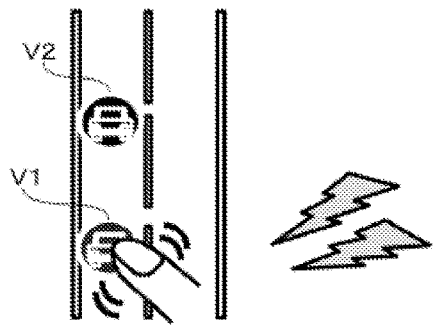
FIG. 40B is a diagram illustrating another display example according to the embodiment of the present invention in a case where a drag operation is disabled.

FIG. 40A and FIG. 40B are diagrams illustrating another display example in a case where a drag operation is disabled. In FIG. 40A, an example in which, at the starting of dragging of the host vehicle icon V1, in a case where a start of an operation is disabled, a color of a background such as a road or the like is changed is illustrated. When a following operation is enabled, the color of a background is returned to the original color thereof. In FIG. 40B, an example in which, at the starting of dragging of the host vehicle icon V1, in a case where a start of an operation is disabled, in a state where a drag operation cannot be performed, a notification using an error sound or a vibration is performed is illustrated.

During a period for which the host vehicle icon is dropped and following traveling is established, image generation unit 12 may display a state of the nearby vehicle as a ghost, and display a trajectory of the host vehicle. During a period for which the host vehicle icon is dropped and following traveling is established, image generation unit 12 may change a display state of the host vehicle icon (flashing, a color change, a size, a position, or the like). During a period for which the host vehicle icon is dropped and following traveling is established, determination unit 11 may queue a next instruction as an additional operation (reserve control to be performed after completion of current control). During a period for which the host vehicle icon is dropped and following traveling is established, in a case where a following operation is temporarily disabled due to waiting for the light to change or the like, image generation unit 12 may perform a display such as "trying" until following control is established. During dragging of the host vehicle icon, or during a period for which the host vehicle icon is dropped and following traveling is established, image generation unit 12 may display an estimated required-time or a remaining required-time until the host vehicle icon is dropped and following traveling is established. In a case where following traveling control is temporarily disabled, the control may be set in advance to be continued until the control is enabled or suspended and stopped.

As described above, according to the present embodiment, an icon displayed on the touch panel is moved by a gesture, and thus it is possible to transfer the contents of various operations to automatic driving controller 20. The gesture operation of the icon is a simple operation, and thus a driver is released from a driving operation in the related art such as turning of steering 51, depressing of accelerator pedal 53, or the like. For example, it is possible to easily instruct following traveling, by displaying the schematic diagram including a host vehicle icon and a nearby vehicle icon and moving the host vehicle icon onto the nearby vehicle icon. A driver can perform a confirmation of a peripheral situation and an operation instruction on the touch panel at the same time, and thus the sight line of the driver does not move. Accordingly, it is possible to reduce the possibility of an erroneous operation and realize safer driving. Although a gesture operation corresponding to a control command is described as a drag-and-drop operation or the like, a touch- and touch operation may be used. A predetermined operation is preferably used, but an operation that is customizable by a driver may be used. Further, in order to recognize the corresponding relationship of a gesture operation and a control command, a comment, an icon, or an arrow may be displayed by display unit, or a guide display or a voice guidance may be provided by display unit 31.

As above, the present invention has been described based on the embodiments. These embodiments have been presented by way of example only, and it should be understood by those skilled in the art that the embodiments can be modified in various forms by combining the respective elements or processing processes, and the modification examples are included in the scope of the present invention.

For example, although an example in which HMI controller 10 is implemented by a dedicated LSI is assumed, functions of HMI controller 10 may be realized using a CPU in a portable device such as a smart phone or a tablet that is used as display device 30. In this case, a portable device that is used as display device 30 and automatic driving controller 20 are directly connected to each other. Functions of HMI controller 10 may be realized by a CPU in a head unit such as a car navigation device, a display audio, or the like. A dedicated LSI on which HMI controller 10 is mounted may be included in a head unit.

The embodiments may be specified by the following items.

[Item 1]

A driving support device (10) including:

an image output unit (14a) that outputs an image including a host vehicle object representing a host vehicle and a nearby vehicle object representing a nearby vehicle, to a display unit (31);

an operation signal input unit (14b) that receives an operation of a user for changing a distance between the host vehicle object and the nearby vehicle object in the image displayed on the display unit (31); and a command output unit (14*c*) that outputs a command for instructing one vehicle to travel following another vehicle when the distance between the host vehicle object and the nearby vehicle object is equal to or less than a predetermined distance, to an automatic driving control unit (20) that controls automatic driving.

In this case, a user can intuitively and conveniently perform an operation for instructing the following traveling.

[Item 2]

The driving support device according to Item 1, in which when the operation signal input unit (14*b*) receives an operation of the user for moving the host vehicle object in the image displayed on the display unit (31) to the position of the nearby vehicle object, or an operation of the user for moving the nearby vehicle object to the position of the host vehicle object, the command output unit (14*c*) outputs a command for instructing the following traveling, to the automatic driving control unit (20).

In this case, a user can intuitively and conveniently perform an operation for instructing the following traveling.

[Item 3]

The driving support device (10) according to Item 1 or 2, further including: a notification unit (14) that notifies the nearby vehicle of a radio signal for notifying the following traveling through a vehicle-to-vehicle communication or a relay device.

In this case, it is possible to intuitively and conveniently perform an operation for notifying that the host vehicle travels following the nearby vehicle, or an operation for notifying that the nearby vehicle travels following the host vehicle.

[Item 4]

The driving support device (10) according to Item 1, in which when the operation signal input unit (14*b*) receives an operation of the user for changing the distance between the host vehicle object and the nearby vehicle object in the image displayed on the display unit (31) in a state of the following traveling, the command output unit (14*c*) outputs a command for instructing the change of the inter-vehicle distance between the host vehicle and the nearby vehicle, to the automatic driving control unit (20).

In this case, it is possible to intuitively and conveniently perform an operation for changing the inter-vehicle distance during the following traveling.

[Item 5]

The driving support device (10) according to Item 1, in which when the operation signal input unit (14*b*) receives an operation of the user for changing a distance between two points on an imaginary line connecting the host vehicle object and the nearby vehicle object in the image displayed on the display unit (31) in a state of the following traveling, the command output unit (14*c*) outputs a command for instructing the change of the inter-vehicle distance between the host vehicle and the nearby vehicle, to the automatic driving control unit (20).

In this case, it is possible to intuitively and conveniently perform an operation for changing the inter-vehicle distance during the following traveling.

[Item 6]

The driving support device (10) according to Item 4 or 5, further including: a notification unit (14) that notifies the nearby vehicle of a radio signal for notifying the change of the inter-vehicle distance between the host vehicle and the nearby vehicle through a vehicle-to-vehicle communication or a relay device.

In this case, it is possible to intuitively and conveniently perform an operation for notifying the nearby vehicle of the change of the inter-vehicle distance.

[Item 7]

The driving support device (10) according to Item 1, in which when the operation signal input unit (14*b*) receives an operation of the user for interchanging the host vehicle object and the nearby vehicle object in the image displayed on the display unit (31) in a state of the following traveling, the command output unit (14*c*) outputs a command for instructing the switching from a state in which one vehicle travels following another vehicle to a state in which the another vehicle travels following the one vehicle, to the automatic driving control unit (20).

In this case, it is possible to intuitively and conveniently perform an operation for switching the order of vehicles during the following traveling.

[Item 8]

The driving support device (10) according to Item 1, in which when the operation signal input unit (14*b*) receives an operation of the user for moving the host vehicle object or the nearby vehicle object in the image displayed on the display unit (31) to the outside of an imaginary line connecting the host vehicle object and the nearby vehicle object in a state of the following traveling, the command output unit (14*c*) outputs a command for instructing the release of the following traveling, to the automatic driving control unit (20).

In this case, it is possible to intuitively and conveniently perform an operation for releasing the following traveling.

[Item 9]

The driving support device (10) according to Item 1, in which when the operation signal input unit (14*b*) receives an operation of the user for making an imaginary line connecting the host vehicle object and the nearby vehicle object in the image displayed on the display unit (31) intersect at an instruction point in a state of the following traveling, the command output unit (14*c*) outputs a command for instructing the release of the following traveling, to the automatic driving control unit (20).

In this case, it is possible to intuitively and conveniently perform an operation for releasing the following traveling.

[Item 10]

The driving support device (10) according to any one of Items 1 to 9, in which the image output unit (14*a*) outputs an image including a following object representing the following traveling between the host vehicle object and the nearby vehicle object in a state of the following traveling, to the display unit (31).

In this case, a user can intuitively recognize that the host vehicle and the nearby vehicle are in following traveling.

[Item 11]

The driving support device (10) according to Item 10, in which the following object is a spring-shaped object or a string-shaped object.

In this case, a user can intuitively recognize that the host vehicle and the nearby vehicle are in following traveling.

[Item 12]

A driving support system (10, 30) including:
a display device (30) that displays an image; and
a driving support device (10) that outputs an image to the display device (30),
in which the driving support device (10) includes:
an image output unit (14*a*) that outputs an image including a host vehicle object representing a host vehicle and a nearby vehicle object representing nearby vehicle, to the display device (30);

an operation signal input unit (14b) that receives an operation of a user for changing a distance between the host vehicle object and the nearby vehicle object in the image displayed on the display device (30); and a command output unit (14c) that outputs a command for instructing one vehicle to travel following another vehicle when the distance between the host vehicle object and the nearby vehicle object is equal to or less than a predetermined distance, to an automatic driving control unit (20) that controls automatic driving.

In this case, a user can intuitively and conveniently perform an operation for instructing the following traveling.

[Item 13]

A driving support method including:

a step of outputting an image including a host vehicle object representing a host vehicle and a nearby vehicle object representing nearby vehicle, to a display unit (31);

a step of receiving an operation of a user for changing a distance between the host vehicle object and the nearby vehicle object in the image displayed on the display unit (31); and a step of outputting a command for instructing one vehicle to travel following the another vehicle when the distance between the host vehicle object and the nearby vehicle object is equal to or less than a predetermined distance, to an automatic driving control unit (20) that controls automatic driving.

In this case, a user can intuitively and conveniently perform an operation for instructing the following traveling.

[Item 14]

A driving support program causing a computer to perform:

processing of outputting an image including a host vehicle object representing a host vehicle and a nearby vehicle object representing a nearby vehicle, to a display unit (31);

processing of receiving an operation of a user for changing a distance between the host vehicle object and the nearby vehicle object in the image displayed on the display unit (31); and processing of outputting a command for instructing one vehicle to travel following the another vehicle when the distance between the host vehicle object and the nearby vehicle object is equal to or less than a predetermined distance, to an automatic driving control unit (20) that controls automatic driving.

In this case, a user can intuitively and conveniently perform an operation for instructing the following traveling.

[Item 15]

An automatic drive vehicle (1) including:

an image output unit (14a) that outputs an image including a host vehicle object representing a host vehicle and a nearby vehicle object representing a nearby vehicle, to a display unit (31);

an operation signal input unit (14b) that receives an operation of a user for changing a distance between the host vehicle object and the nearby vehicle object in the image displayed on the display unit (31);

a command output unit (14c) that outputs a command for instructing one vehicle to travel following another vehicle when the distance between the host vehicle object and the nearby vehicle object is equal to or less than a predetermined distance; and an automatic driving control unit (20) that executes the output command.

In this case, a user can intuitively and conveniently perform an operation for instructing the following traveling.

INDUSTRIAL APPLICABILITY

The present invention can be used in a vehicle equipped with automatic driving mode.

REFERENCE MARKS IN THE DRAWINGS 1 vehicle
10 HMI controller (driving support device)
11 determination unit
12 image generation unit
13 instruction unit
14 input-output unit
14a image output unit
14b operation signal input unit
14c command output unit
14d vehicle information input unit
20 automatic driving controller (automatic driving control device)
21 control unit
22 memory unit
23 input-output unit
30 display device
31 display unit
32 input unit
40 detection unit
41 position information acquisition unit
42 sensor
43 speed information acquisition unit
44 map information acquisition unit
50 driving operation unit
51 steering
52 brake pedal
53 accelerator pedal
54 blinker switch

The invention claimed is:

1. A driving support device comprising:

an image output unit which, in operation, outputs an image including a vehicle icon representing a vehicle and another vehicle icon representing another vehicle, to a display unit;

an operation signal input unit which, in operation, receives an operation of a user dragging, on a touch panel, the vehicle icon or the another vehicle icon in the image such that a distance between the vehicle icon and the another vehicle icon changes in the image displayed on the display unit; and a command output unit that outputs a command to an automatic driving control unit which, in operation, controls automatic driving, in response to the distance between the vehicle icon and the another vehicle icon in the image being equal to or less than a predetermined distance, the command being for instructing following travelling in which the vehicle travels following the another vehicle or the another vehicle travels following the vehicle.

2. The driving support device of claim 1, wherein in response to the operation signal input unit receiving an operation of the user for dragging the vehicle icon to a position of the another vehicle icon in the image displayed on the display unit, or an operation of the user for dragging the another vehicle icon to a position of the vehicle icon in the image displayed on the display unit, the command output unit outputs a command for instructing the following traveling, to the automatic driving control unit.

3. The driving support device of claim 1, further comprising:
a notification unit which, in operation, notifies the another vehicle of a radio signal for notifying the following traveling through a vehicle-to-vehicle communication or a relay device.

4. The driving support device of claim 1,
wherein in response to the operation signal input unit receiving an operation of the user for changing the distance between the vehicle icon and the another vehicle icon in the image displayed on the display unit in a state of the following traveling, the command output unit outputs a command for instructing the change of an inter-vehicle distance between the vehicle and the another vehicle, to the automatic driving control unit.

5. The driving support device of claim 4, further comprising:
a notification unit which, in operation, notifies the another vehicle of a radio signal for notifying the change of the inter-vehicle distance between the vehicle and the another vehicle through a vehicle-to-vehicle communication or a relay device.

6. The driving support device of claim 1,
wherein in response to the operation signal input unit receiving an operation of the user for changing a distance between two points on an imaginary line connecting the vehicle icon and the another vehicle icon in the image displayed on the display unit in a state of the following traveling, the command output unit outputs a command for instructing the change of an inter-vehicle distance between the vehicle and the another vehicle, to the automatic driving control unit.

7. The driving support device of claim 1,
wherein in response to the operation signal input unit receiving an operation of the user for interchanging the vehicle icon and the another vehicle icon in the image displayed on the display unit in a state of the following traveling, the command output unit outputs a command for instructing switching from a state in which one of the vehicle and the another vehicle travels following the other vehicle of the vehicle and the another vehicle to a state in which the other vehicle of the vehicle and the another vehicle travels following the one of the vehicle and the another vehicle, to the automatic driving control unit.

8. The driving support device of claim 1,
wherein in response to the operation signal input unit receiving an operation of the user for dragging the vehicle icon or the another vehicle icon in the image displayed on the display unit to an outside of an imaginary line connecting the vehicle icon and the another vehicle icon in a state of the following traveling, the command output unit outputs a command for instructing release of the following traveling, to the automatic driving control unit.

9. The driving support device of claim 1,
wherein in response to the operation signal input unit receiving an operation of the user for making an imaginary line connecting the vehicle icon and the another vehicle icon in the image displayed on the display unit intersect at an instruction point in a state of the following traveling, the command output unit outputs a command for instructing release of the following traveling, to the automatic driving control unit.

10. The driving support device of claim 1,
wherein the image output unit, in operation, outputs an image including a following object representing the following traveling between the vehicle icon and the another vehicle icon in a state of the following traveling, to the display unit.

11. The driving support device of claim 10,
wherein the following object is a spring-shaped object or a string-shaped object.

12. The driving support device of claim 1
wherein, in response to the operation signal input unit receiving an operation of the user touching down, on the touch panel, in a display area of the vehicle icon and touching up, on the touch panel, in a display area of the another vehicle icon in the image displayed on the display unit, the command output unit outputs a command for instructing the following traveling in which the vehicle travels following the another vehicle to the automatic driving control unit.

13. A driving support system comprising:
a display device which, in operation, displays an image; and
a driving support device which, in operation, outputs an image to the display device,
wherein the driving support device includes:
an image output unit which, in operation, outputs an image including a vehicle icon representing a vehicle and another vehicle icon representing another vehicle, to the display device;
an operation signal input unit which, in operation, receives an operation of a user dragging, on a touch panel, the vehicle icon or the another vehicle icon in the image such that a distance between the vehicle icon and the another vehicle icon changes in the image displayed on the display device; and
a command output unit which, in operation, outputs a command to an automatic driving control unit which, in operation, controls automatic driving, in response to the distance between the vehicle icon and the another vehicle icon in the image being equal to or less than a predetermined distance, the command being for instructing the vehicle to travel following the another vehicle or the another vehicle to travel following the vehicle.

14. A driving support method comprising:
outputting an image including a vehicle icon representing a vehicle and another vehicle icon representing another vehicle, to a display unit;
receiving an operation of a user moving dragging, on a touch panel, the vehicle icon or the another vehicle icon in the image such that a distance between the vehicle icon and the another vehicle icon changes in the image displayed on the display unit; and
outputting a command to an automatic driving control unit that controls automatic driving in response to the distance between the vehicle icon and the another vehicle icon in the image being equal to or less than a predetermined distance, the command being for instructing the vehicle to travel following the another vehicle or the another vehicle to travel following the vehicle.

* * * * *